United States Patent

[11] 3,548,769

[72] Inventors Robert F. Windstrup
 Chicago;
 Charles W. Hale, Oak Park; Raymond F. Galitz, La Grange Park, Ill.
[21] Appl. No. 474,599
[22] Filed July 26, 1965
[45] Patented Dec. 22, 1970
[73] Assignee Continental Can Company, Inc.
 New York, N.Y.
 a corporation of New York

[54] MACHINE FOR FORMING CANS FROM CLOSED END TUBULAR MEMBERS
 31 Claims, 29 Drawing Figs.
[52] U.S. Cl. ........................................... 113/7,
 113/120H
[51] Int. Cl. ..................................................... B21d 51/26
[50] Field of Search ........................................ 113/1G, 7,
 28, 29, 121C, 120H; 29/38

[56] References Cited
UNITED STATES PATENTS
3,248,774 5/1966 Kraus ............................ 29/38
2,298,366 10/1942 Gladfelter et al. ............. 113/120
3,196,819 7/1965 Lechner et al. ................ 113/120

Primary Examiner—Charles W. Lanham
Assistant Examiner—Michael J. Keenan
Attorney—Diller, Brown, Ramik & Holt ABSTRACT: This disclosure relates to an automatically operating machine for converting closed end tubular members into one-piece cans, the apparatus including means for automatically supplying tubular members and receiving cans therefrom, a turret having a plurality of work holders particularly adapted to receive tubular members, means for indexing the turret, a tool holder cooperable with the work holders of the turret for performing the necessary operations on tubular members carried by the work holders of the turret, and means for effecting the reciprocation of the tool holder in timed relation to the indexing of the turret for sequentially performing the necessary operations on the tubular members to convert the tubular members into cans.

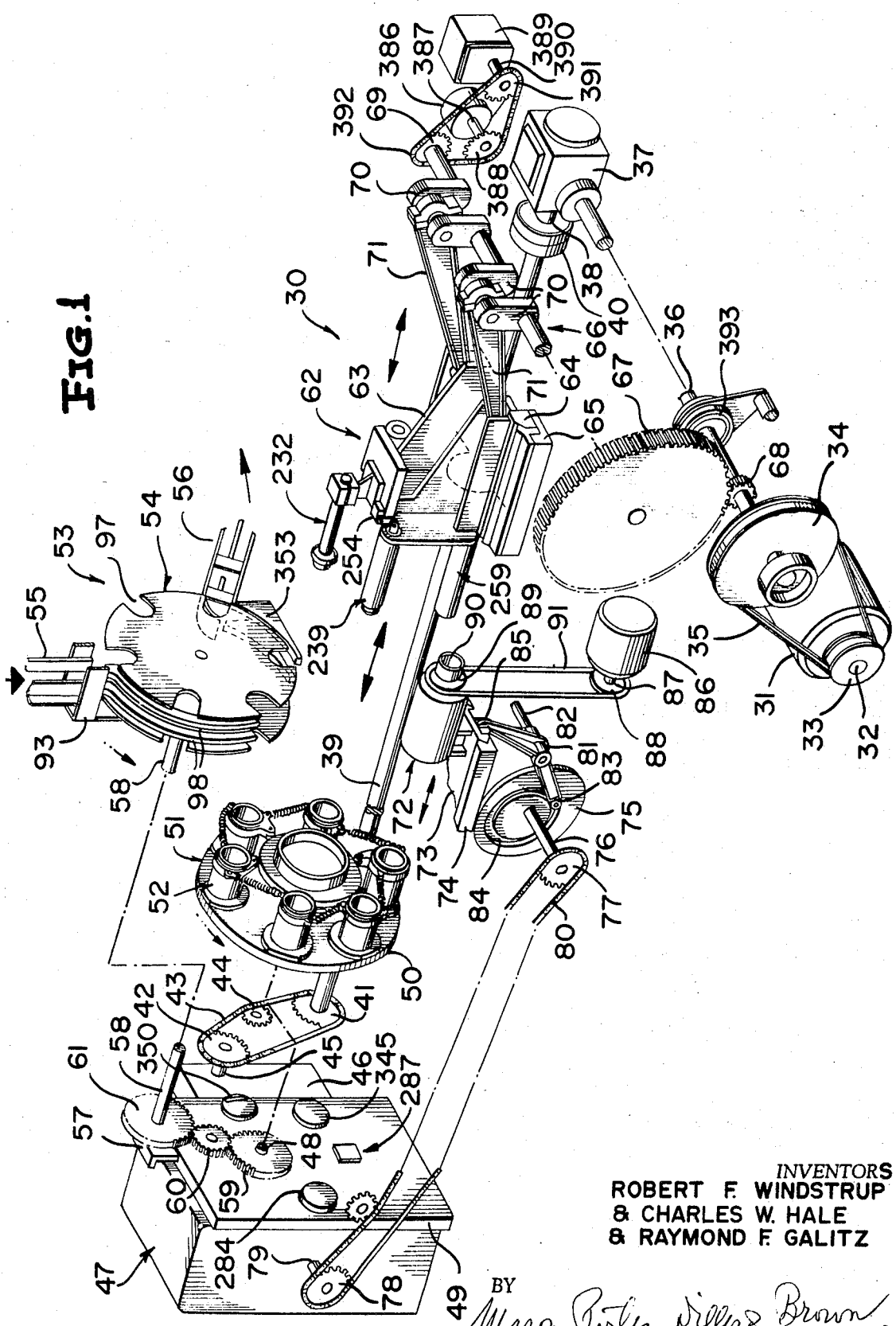

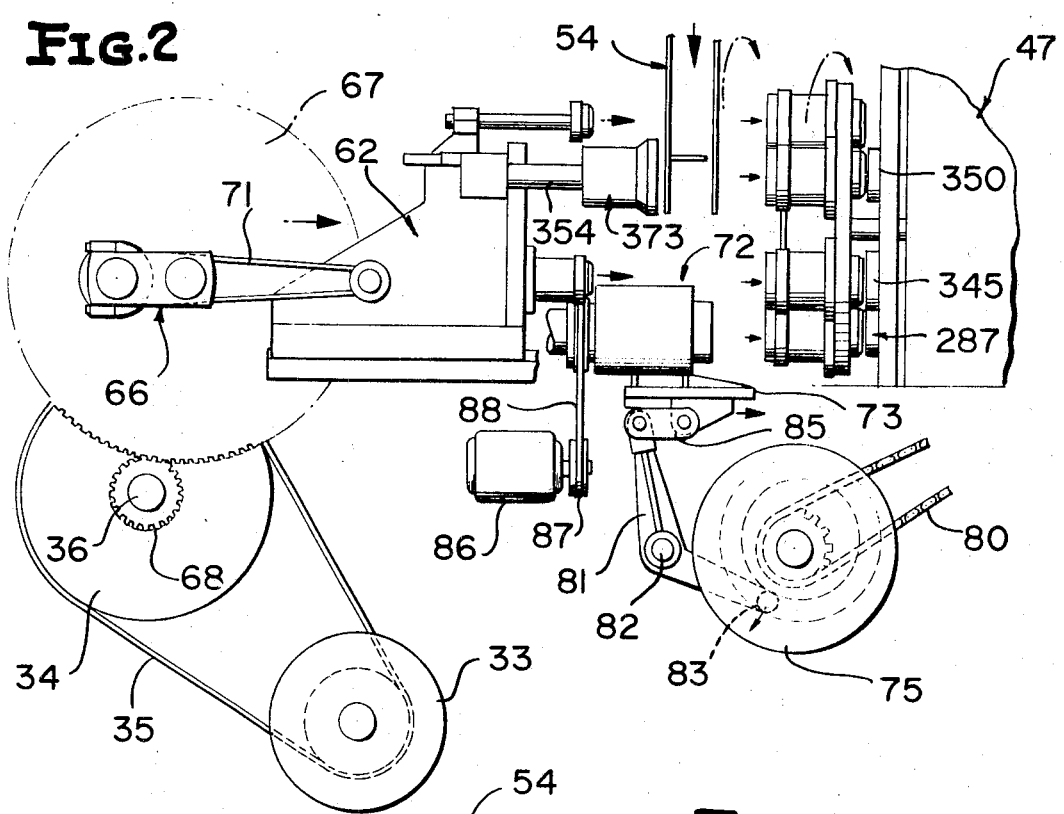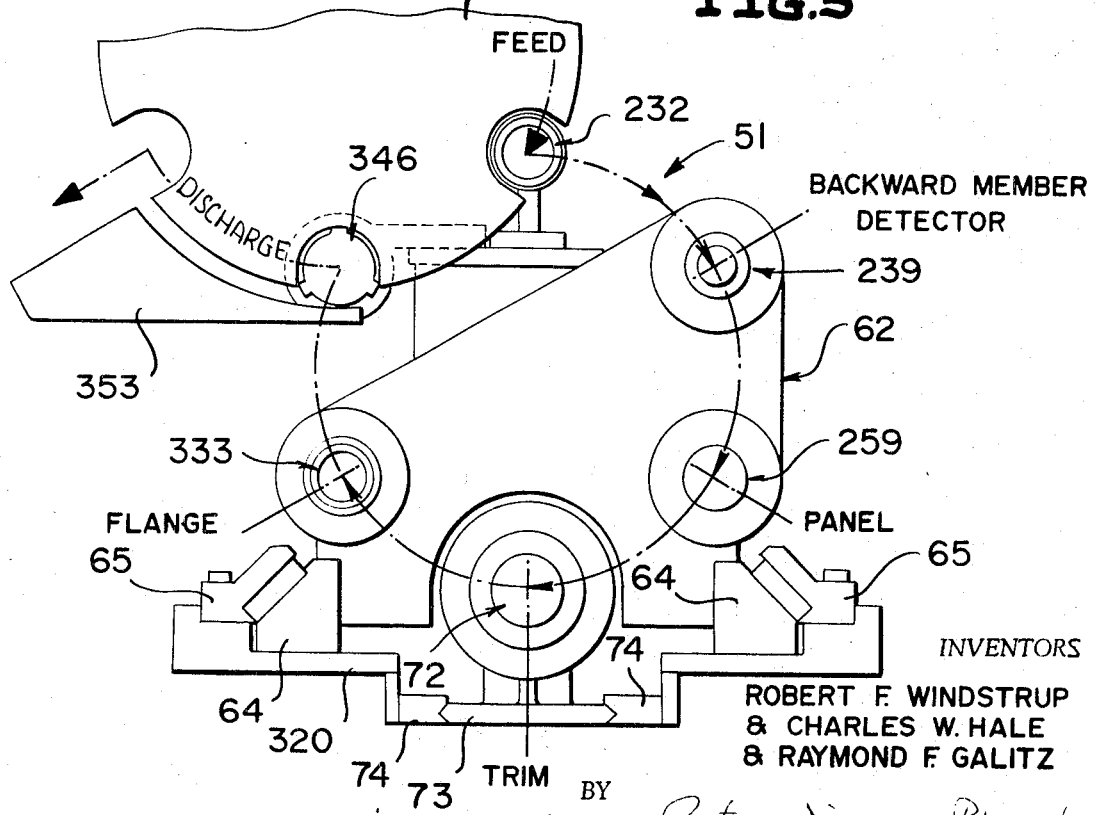

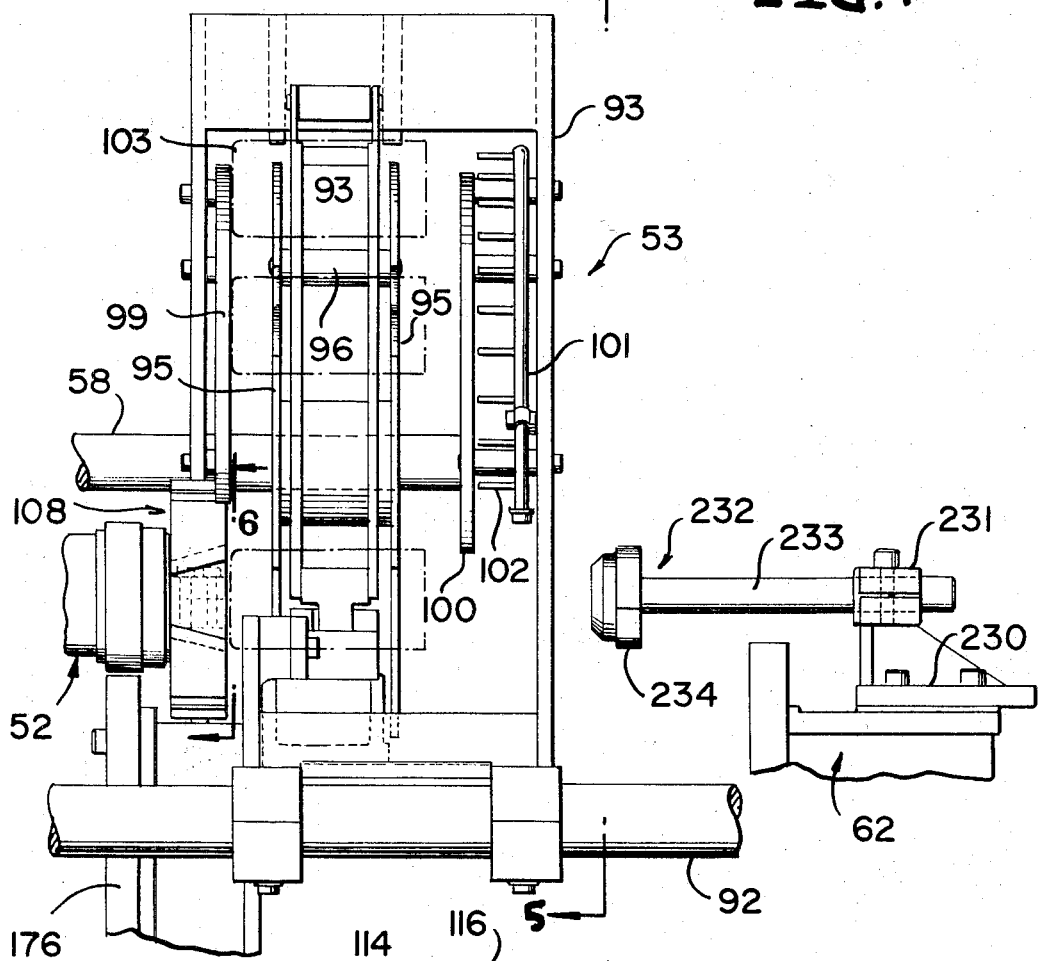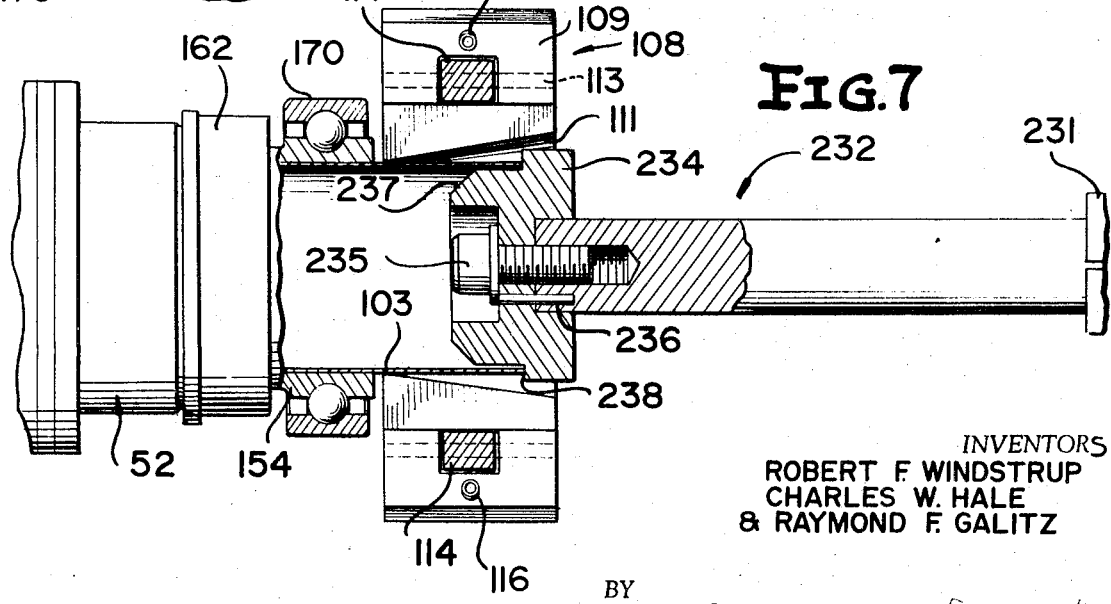

INVENTORS
ROBERT F. WINDSTRUP
CHARLES W. HALE
& RAYMOND F. GALITZ

BY
Mason, Porter, Diller & Brown
ATTORNEYS

INVENTORS
ROBERT F. WINDSTRUP
CHARLES W. HALE
& RAYMOND F. GALITZ

BY Mason, Porter, Diller & Brown
ATTORNEYS

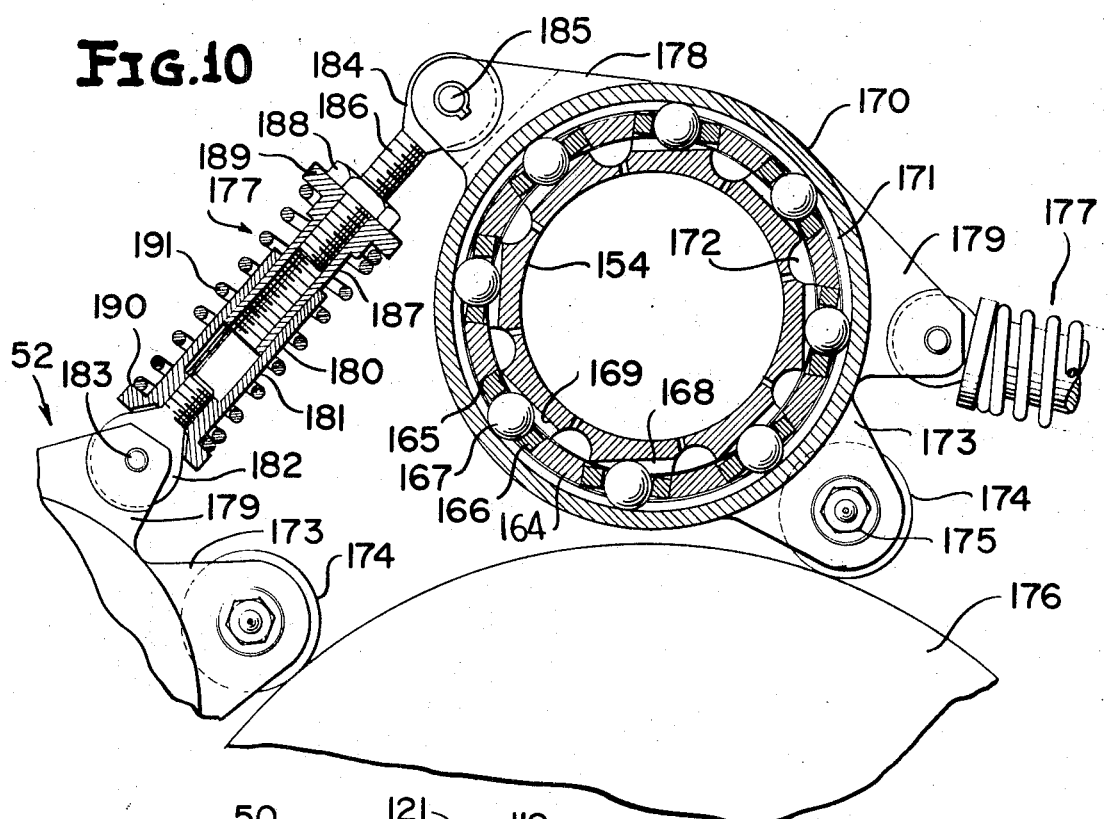
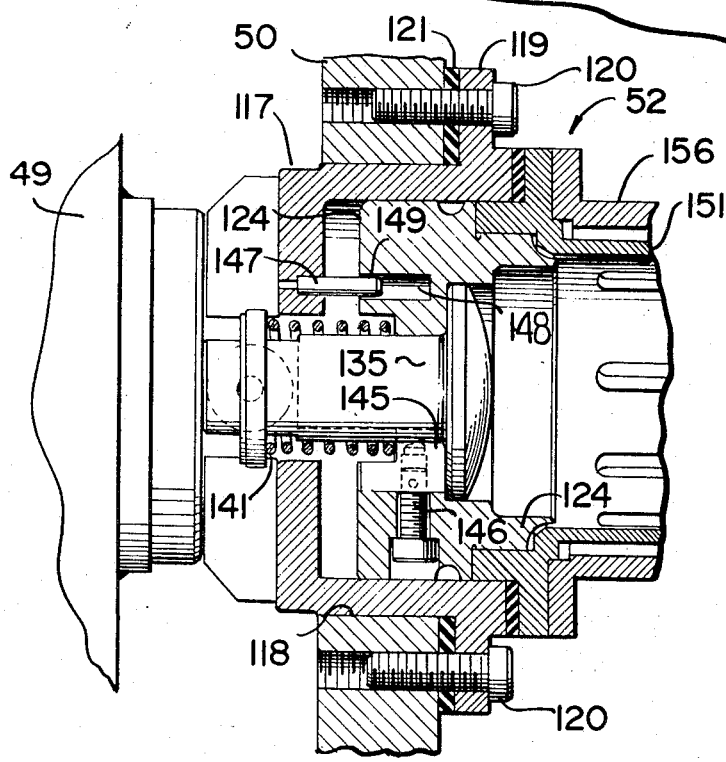

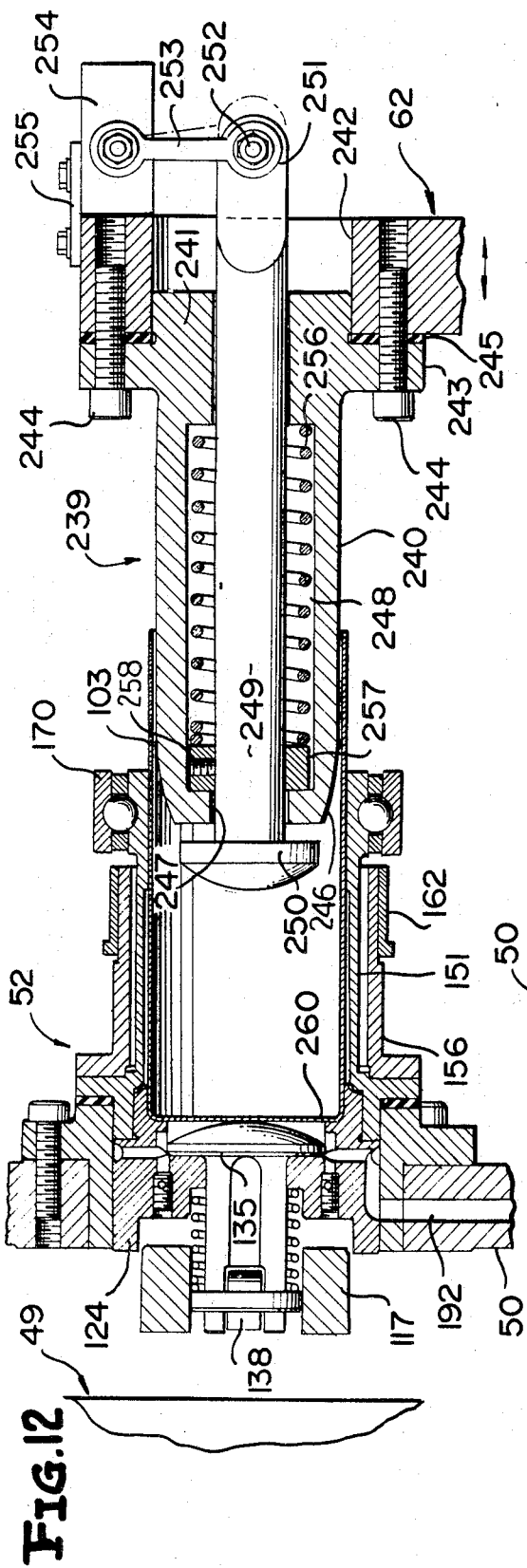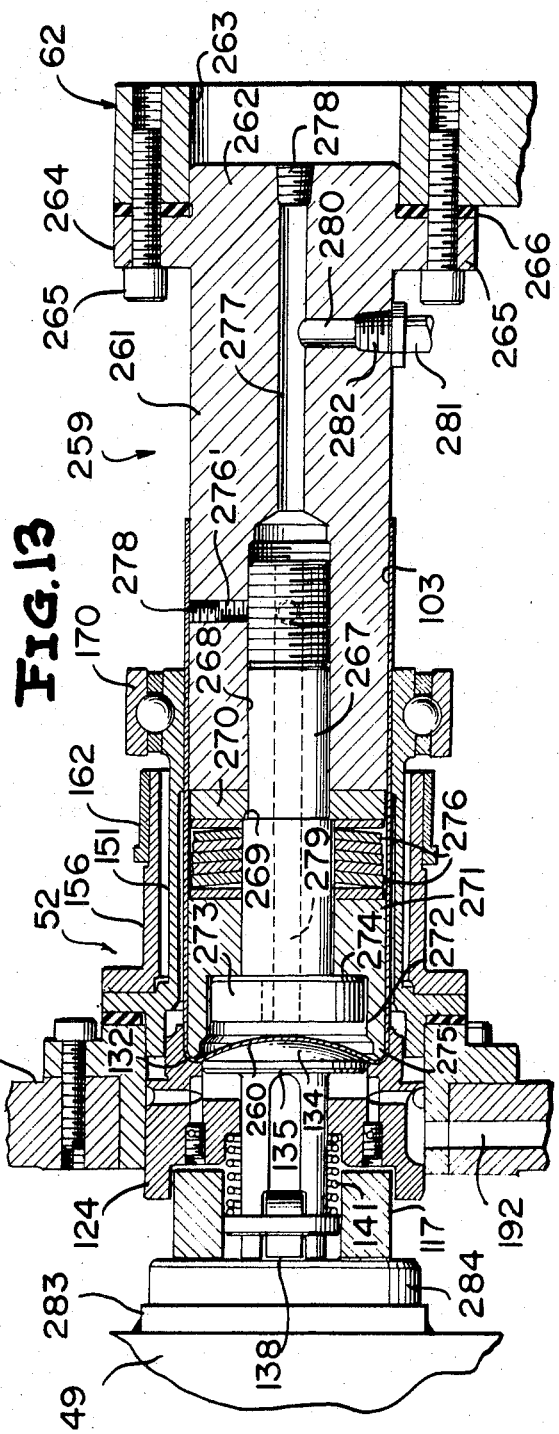

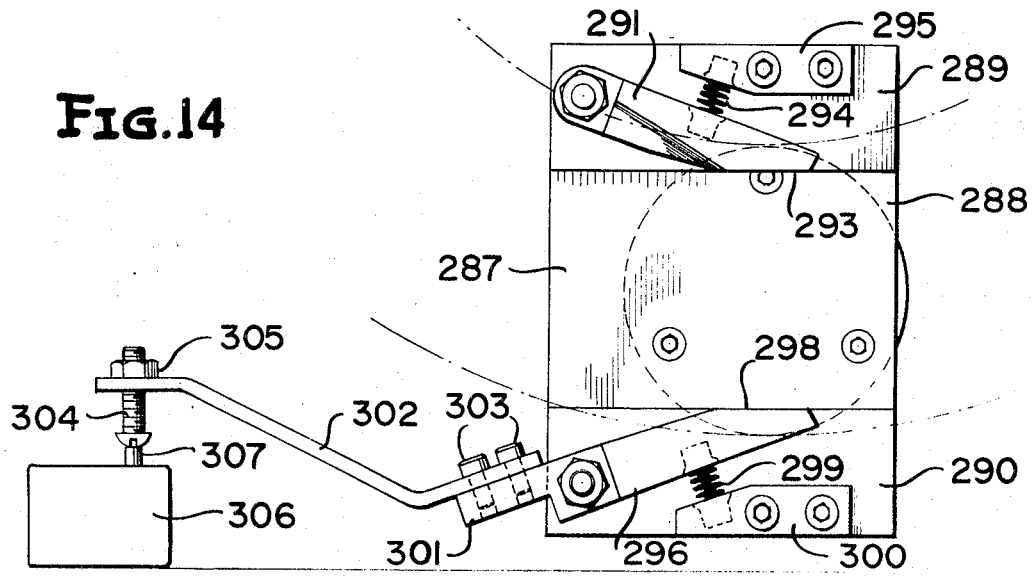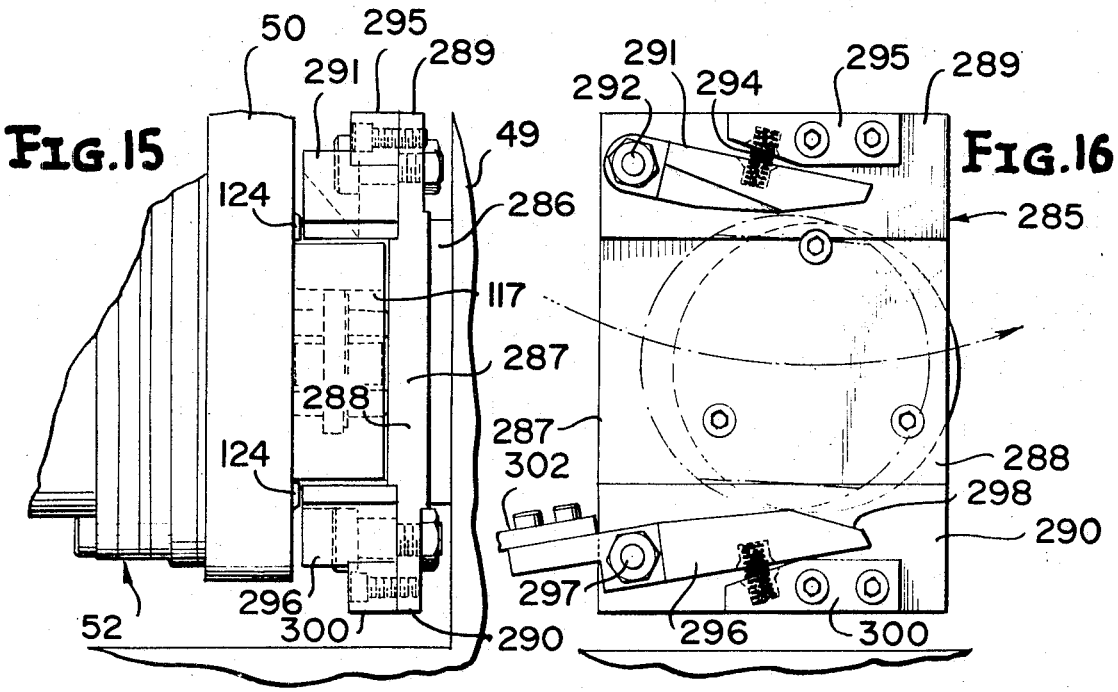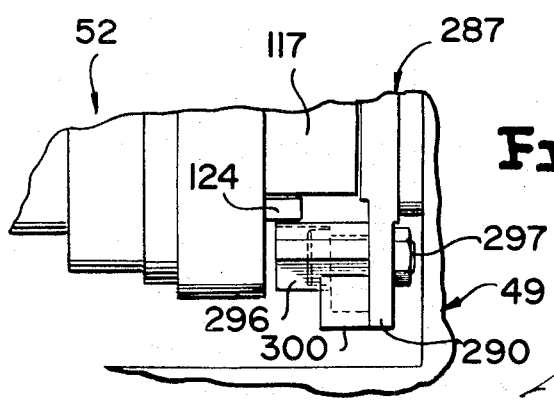

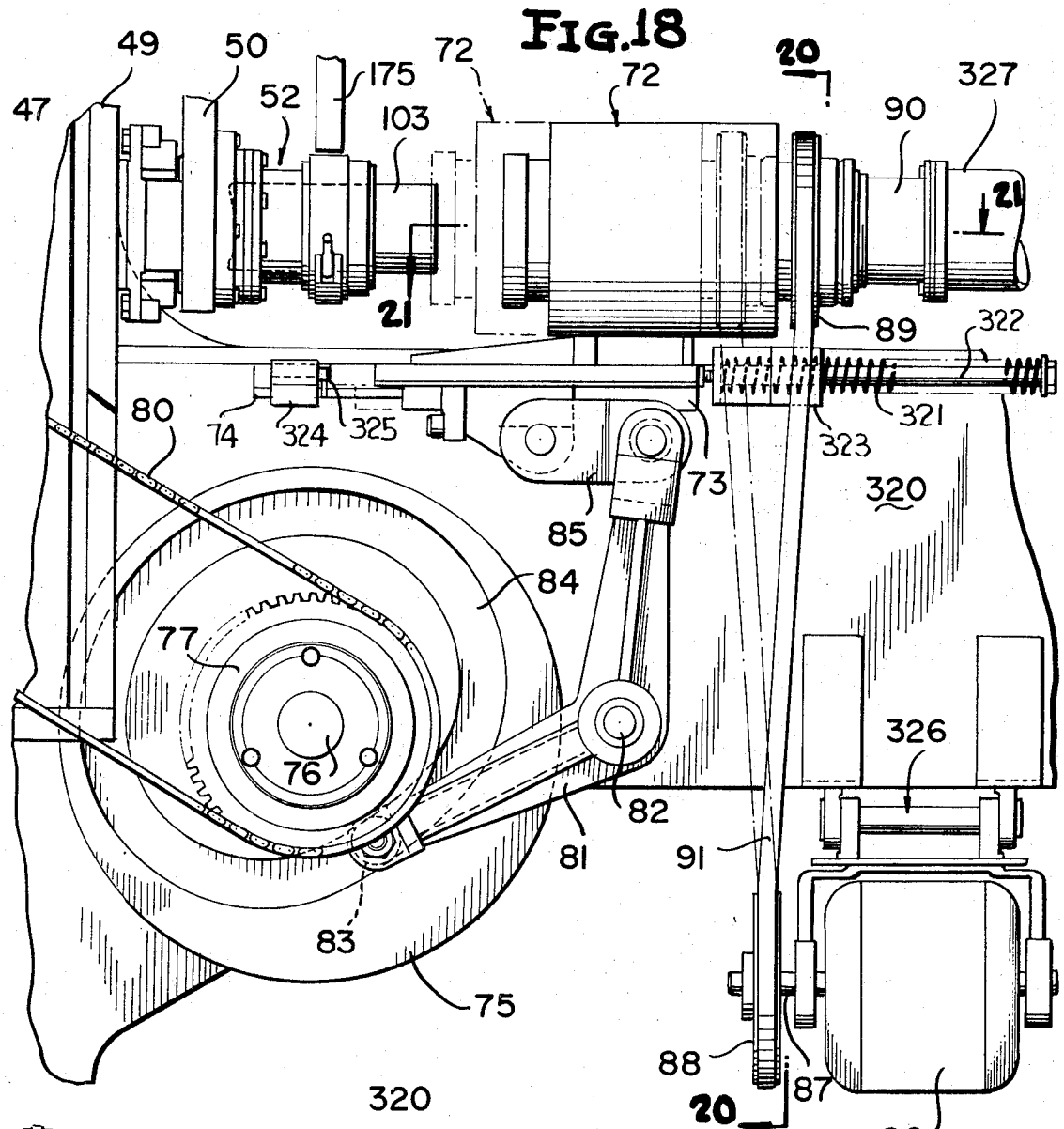
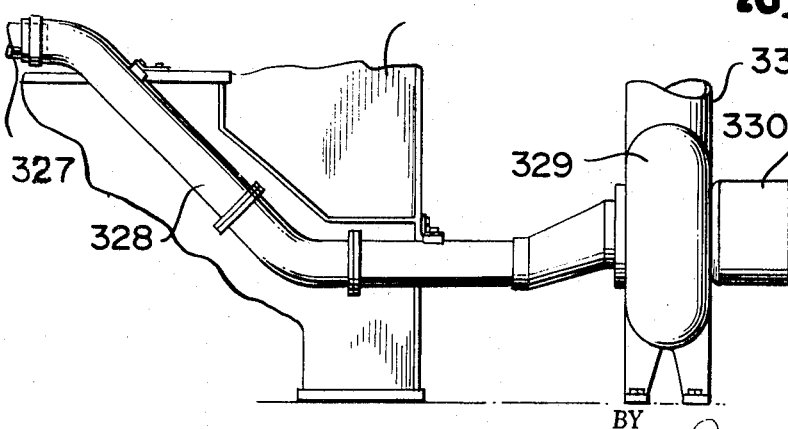

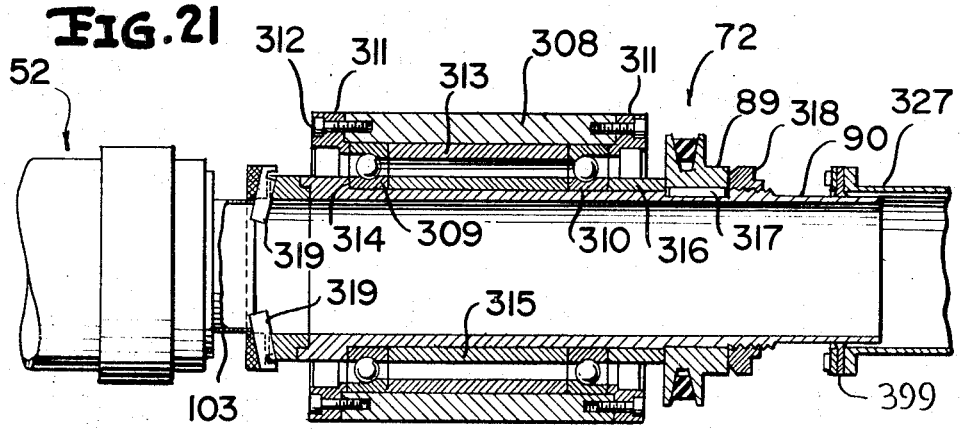
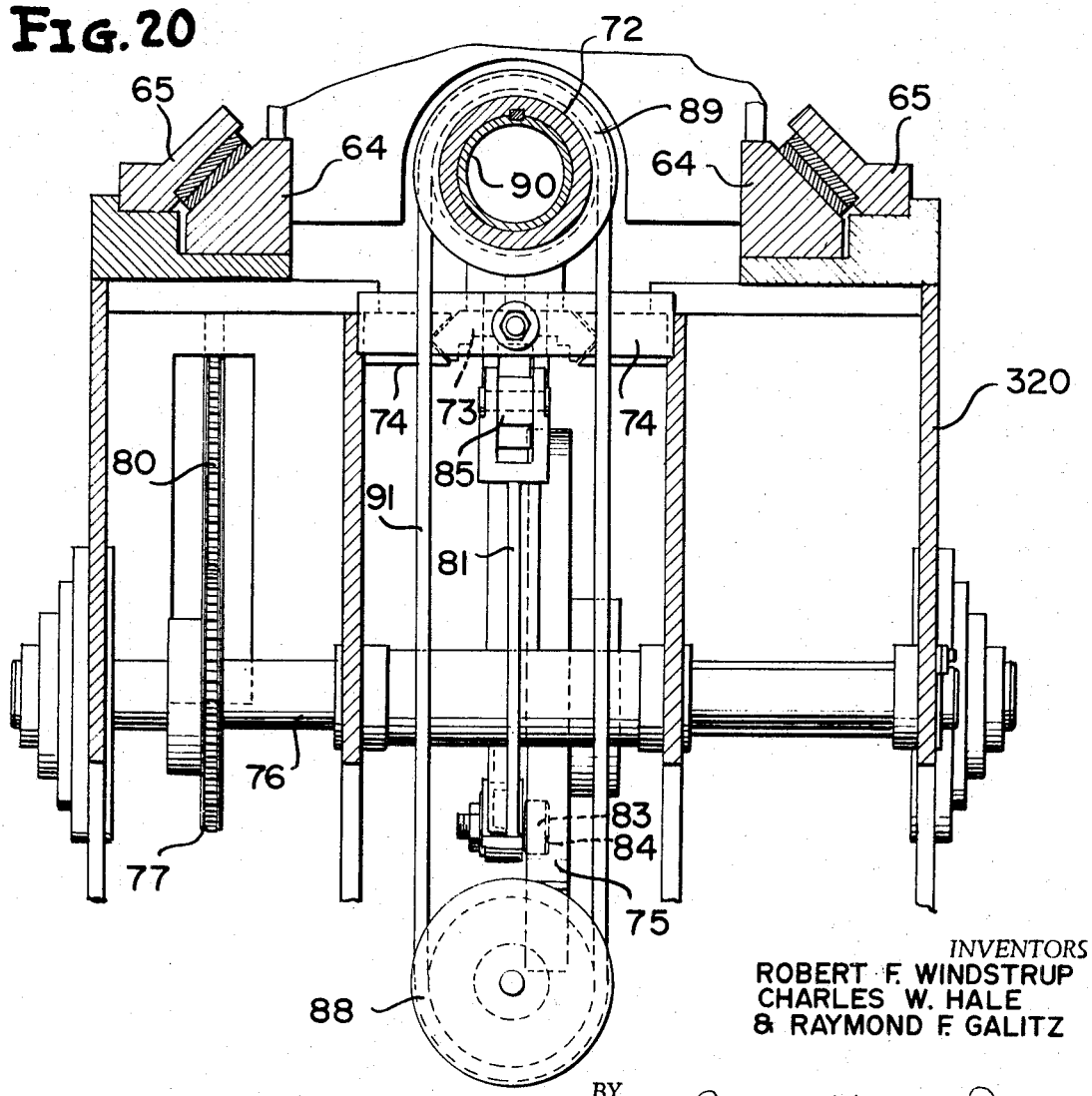

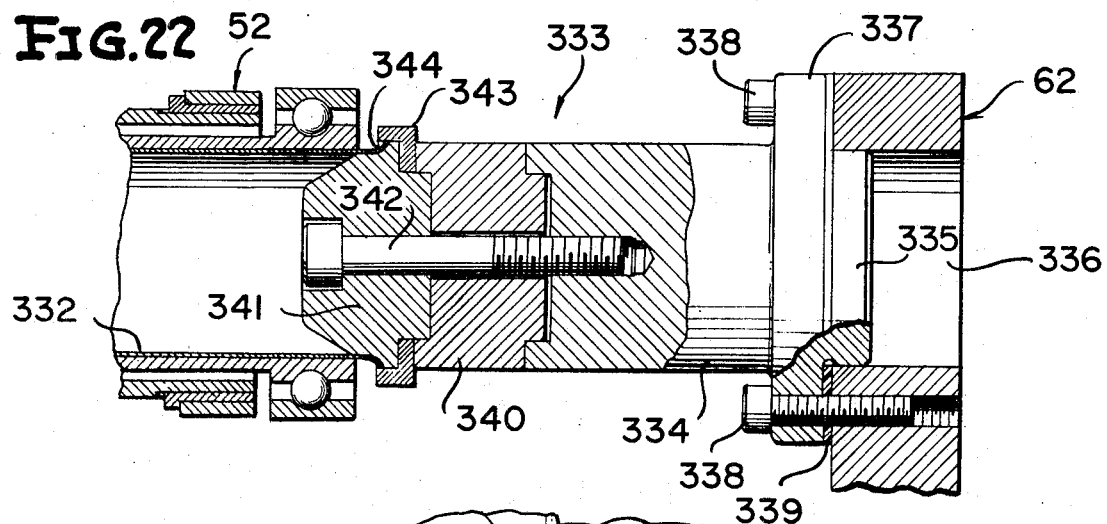
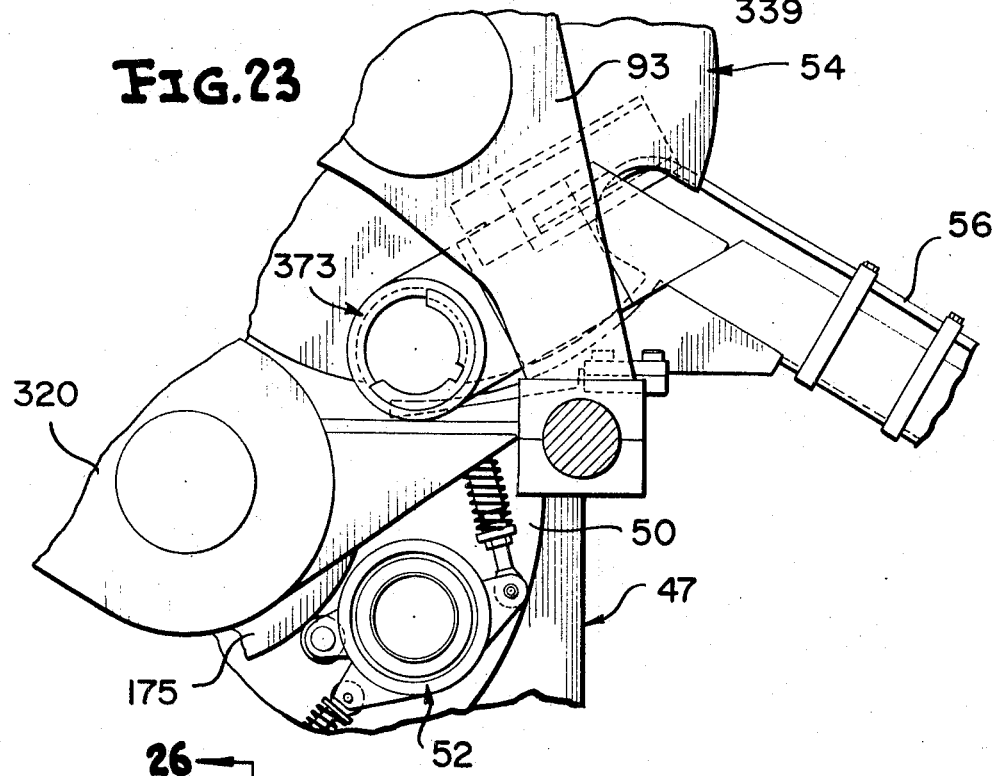
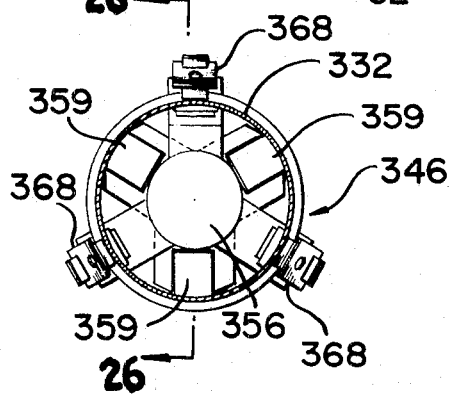

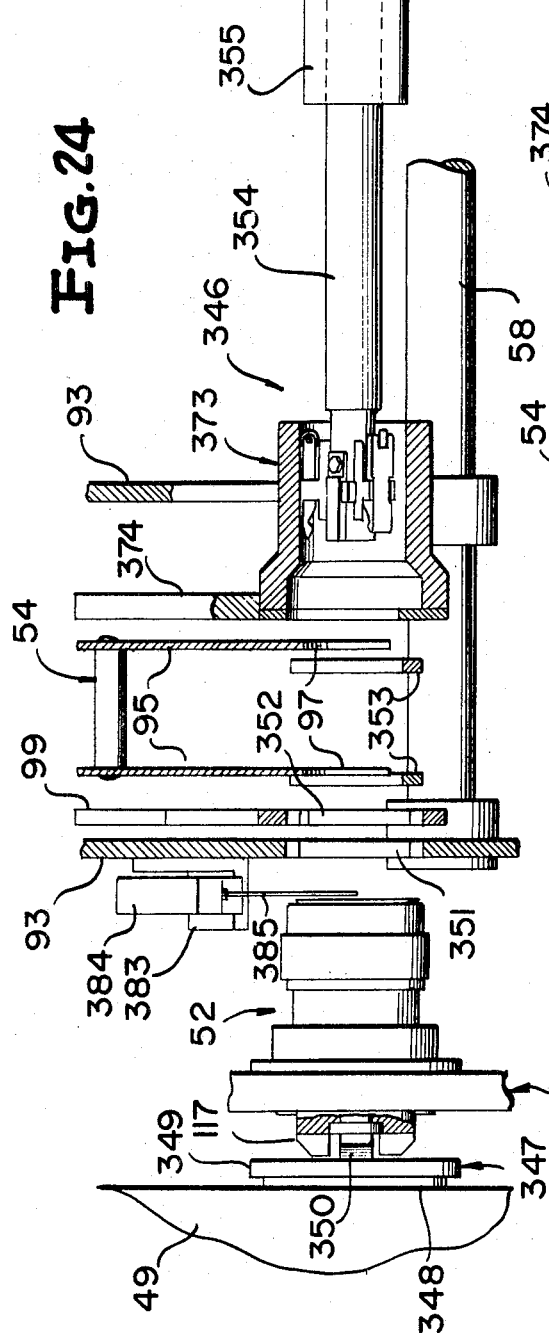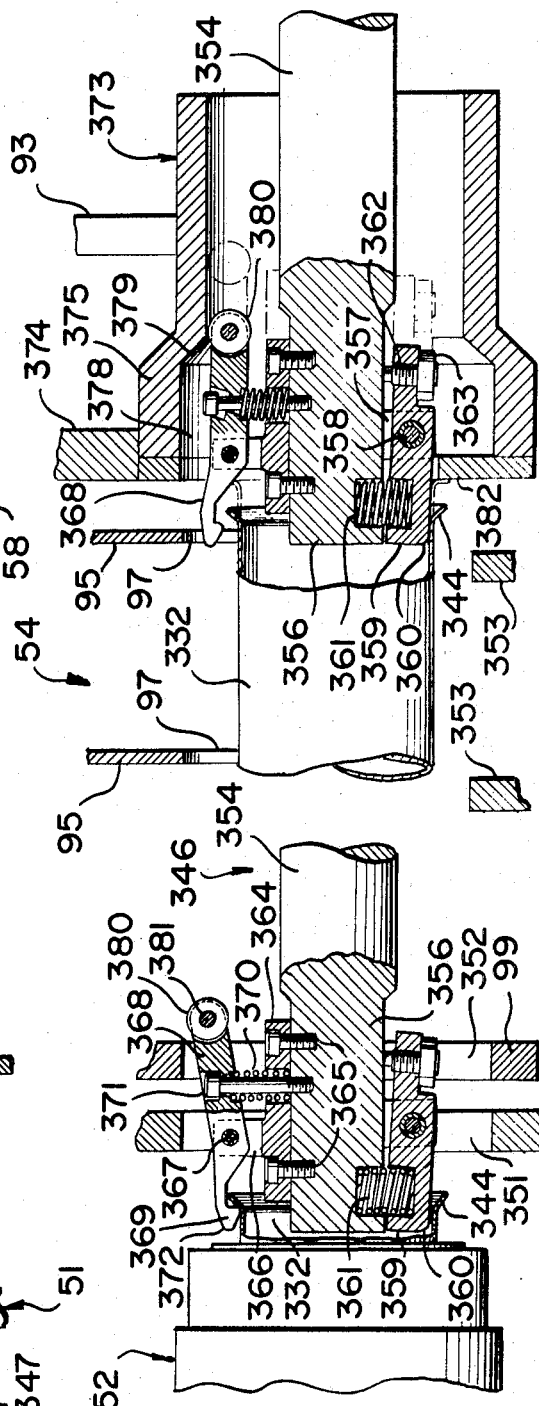

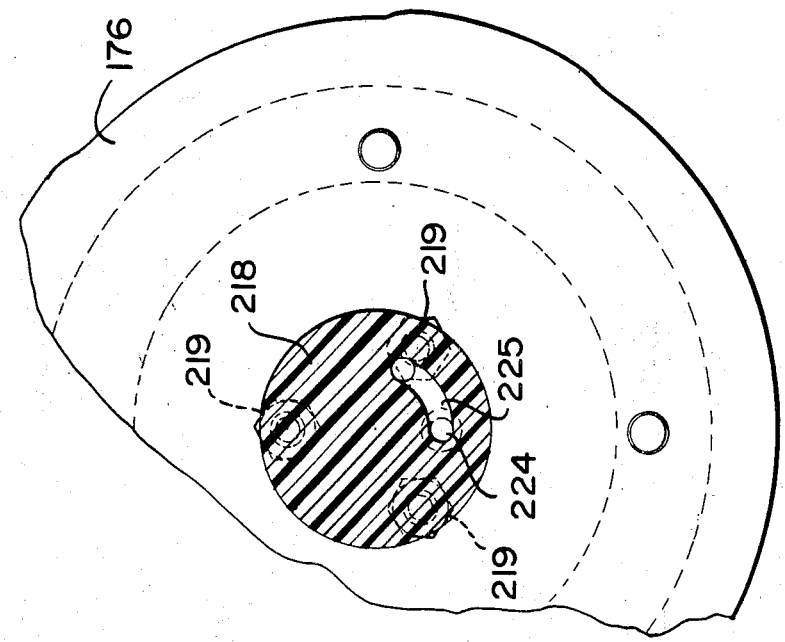
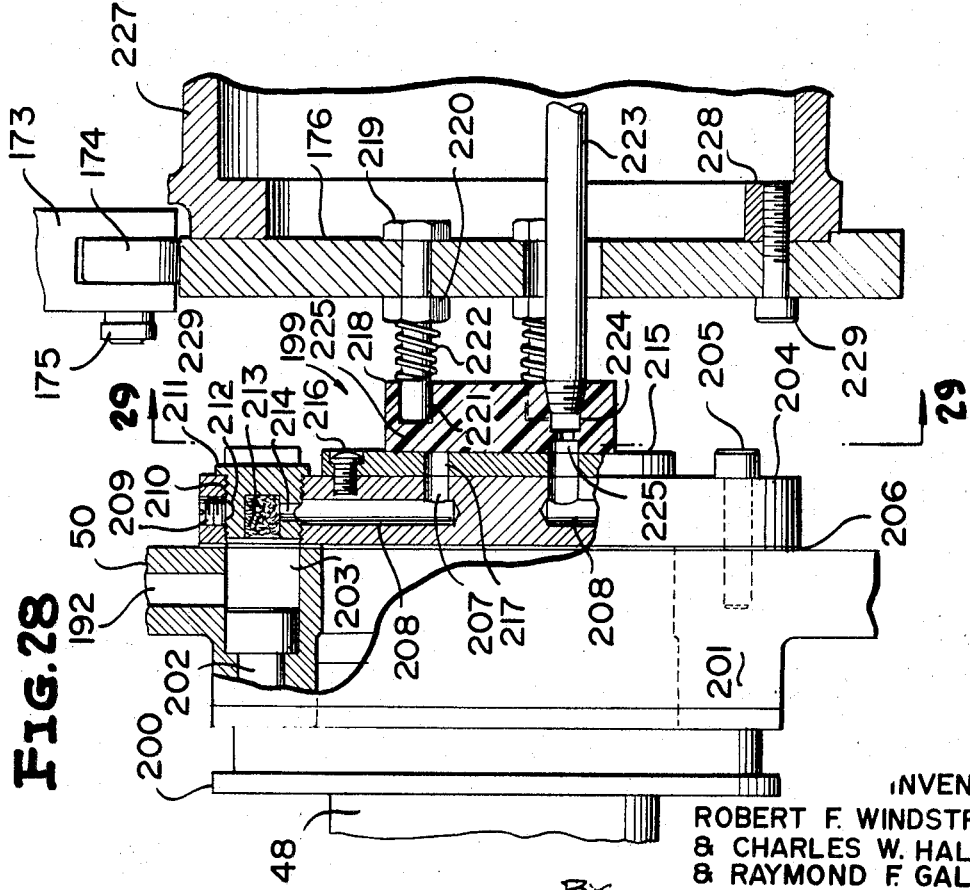

MACHINE FOR FORMING CANS FROM CLOSED END TUBULAR MEMBERS

This invention relates in general to new and useful improvements in machines or apparatus for forming cans from tubular members each having a closed end, the tubular members being generally formed either by an impact extrusion method or by a wall ironing method.

Tubular members which meet the basic requirements of one-piece can bodies can be formed by either impact extrusion methods or by wall ironing methods. These tubular members normally have ends which are flat and joined to the tubular bodies by small radius curves and the opposite ends of the tubular members are open and are irregularly formed. In accordance with this invention, it is proposed to provide a machine or apparatus which will automatically receive such tubular members and sequentially perform operations thereon so as to inspect the members for proper orientation, panel the ends of the members to define an inwardly recessed end thereon, trim the members to proper length and thereafter flange the open ends of the members so as to provide one-piece cans having panelled ends integrally formed with the can bodies and with the open ends of the can bodies being flanged for the reception of a closure by conventional seaming method.

Another object of this invention is to provide an automatically operating machine for converting closed end tubular members into one-piece cans, the apparatus including means for automatically supplying tubular members and receiving cans therefrom, a turret having a plurality of work holders particularly adapted to receive tubular members, means for indexing the turret, a tool holder cooperable with the work holders of the turret for performing the necessary operations on tubular members carried by the work holders of the turret, and means for effecting the reciprocation of the tool holder in timed relation to the indexing of the turret for sequentially performing the necessary operations on the tubular members to convert the tubular members into cans.

Another object of this invention is to provide a novel machine for converting closed end tubular members into cans, the apparatus including a tool holder which is mounted for reciprocatory movement and carrying a plurality of tools cooperative with a plurality of indexing work holders, there being provided means for driving the tool holder and the work holders in timed relation, the drive means including means for automatically returning the tool holder to a fully retracted position when the machine is stopped for any reason.

Another object of this invention is to provide a novel turret for receiving tubular members, the turret including a plurality of holders particularly adapted to receive tubular members, each of the holders having a collet type article positioning and retaining apparatus, and fixed cam means for automatically opening and closing the collet type positioning apparatus in response to the rotation of the turret.

Another object of this invention is to provide a novel collet assembly for a plurality of work holders carried by a turret, the collet assembly of each work holder including a clamping apparatus which includes an oscillatable ring which is shifted by means of a cam, the rings of adjoining work holders being resiliently interconnected whereby one collet apparatus reacts on the next adjacent one to constantly urge the collet apparatus to closed positions.

Another object of this invention is to provide a novel work holder for holding closed end tubular members during the conversion into cans having recessed ends, the work holder including a tubular body having an open end and a closed end, the closed end being recessed by a panelling apparatus which includes a panelling die which is mounted for limited movement, and a seat for the tubular member which is axially shiftable relative to the panelling die whereby when the tubular member and seat is moved relative to the panelling die, the end of the tubular member will automatically be panelled.

Another object of this invention is to provide in combination with a work holder of the type set forth above backup means for restricting the movement of the panelling die, and wherein means are provided for detecting when the seat is not automatically returned to its original position after a panelling operation.

Another object of this invention is to provide a novel apparatus for converting closed end tubular members into cans, the apparatus including means for positioning tubular members in the machine, means for flanging the open ends of the tubular members, and retracting means for engaging the flanges to effect the removal of the cans formed from the tubular members.

Still another object of this invention is to provide a novel trimming apparatus for trimming the open ends of tubular members in the conversion thereof into cans, the trimming apparatus being axially reciprocal with respect to a holder for a tubular member and including a hollow body receiving an end of a tubular member to be trimmed, a cutter for progressively trimming the end of the tubular member, and waste disposal means carried by the body for automatically moving the waste axially of the body away from the tubular member as the waste is removed from the tubular member.

A still further object of this invention is to provide an automatic machine for converting closed end tubular members into cans which are flanged for the reception of closures, the machine being of a relatively simple construction for the operations to be performed by the machine and being both relatively jam proof and self-releasing upon the jamming thereof.

With the above and other objects in view that will hereinafter appear, the nature of the invention will be more clearly understood by reference to the following detailed description, the appended claims and the several views illustrated in the accompanying drawings.

In The Drawings:

FIG. 1 is an exploded perspective view showing the basic components of the machine and the relationship thereof.

FIG. 2 is a schematic side elevational view of the machine of FIG. 1 taken from the far side thereof.

FIG. 3 is a schematic view showing the general sequence of operation of the machine, the view being generally an end view of the machine.

FIG. 4 is an enlarged fragmentary side elevational view of the machine and shows generally the details of the means for positioning tubular members in the turret of the machine.

FIG. 7 is an enlarged fragmentary elevational view showing a tubular member being positioned within one of the holders, portions of the holder, the guide and the positioning punch being broken away and shown in section.

FIG. 10 is a fragmentary transverse vertical sectional view taken along the line 10–10 of FIG. 9 and shows the specific details of the collet attachment of the holder.

FIG. 11 is a fragmentary longitudinal vertical sectional view taken along the line 11–11 of FIG. 9 and shows further details of the holder.

FIG. 12 is a longitudinal vertical sectional view taken through one of the holders and a backward tubular member detecting device of the machine.

FIG. 13 is a longitudinal sectional view similar to FIG. 12 and shows a like holder having associated therewith a panelling punch of the machine.

FIG. 14 is an elevational view of a detector for automatically detecting when movable components of the holder do not return to their normal positions after the panelling operation shown in FIG. 13, the view being transversely of the machine.

FIG. 15 is an end view of the detector of FIG. 14 and shows the relationship thereof to the turret and one of the holders carried by the turret.

FIG. 16 is an elevational view of the detector and shows the manner in which it is operated, an associated holder being shown in phantom lines.

FIG. 17 is a side elevational view showing the lower portion of the detector and an associated holder which has not fully retracted and shows the manner in which the detector is actuated.

FIG. 18 is an enlarged fragmentary side elevational view of the trimmer and shows the specific details thereof and the relationship of the trimmer to one of the holders and the tubular member carried thereby.

FIG. 19 is a fragmentary side elevational view of the machine and shows the manner in which the waste trimmed from a tubular member by the trimmer is removed from the machine.

FIG. 20 is a transverse vertical sectional view taken along the line 20–20 of FIG. 18 and shows further the specific details of the mounting and driving of the trimmer.

FIG. 21 is an enlarged fragmentary sectional view taken axially of the trimmer along the line 21–21 of FIG. 18 and shows the specific details of the trimmer spindle.

FIG. 22 is a longitudinal sectional view similar to FIG. 12 and shows a flanging tool flanging the open end of a can while the can is mounted within one of the holders.

FIG. 23 is a fragmentary transverse view showing the general details of the machine in the area of the discharge point of the machine.

FIG. 24 is a longitudinal sectional view taken through the discharge station of the machine and shows the specific details of a retracting apparatus for engaging the flange of a can and withdrawing the can from an associated holder.

FIG. 25 is a transverse sectional view through a can which is engaged by the retractor.

FIG. 26 is a fragmentary longitudinal sectional view taken along the line 26–26 of FIG. 25 and shows the specific details of the retractor and the relationship thereof to the can.

FIG. 27 is a longitudinal sectional view similar to FIG. 26 and shows the manner in which the can is automatically released from the retractor.

FIG. 28 is a fragmentary side elevational view taken through the center of the machine and shows the specific details of a valve for applying vacuum within the work holders at the panelling and trimming stations.

FIG. 29 is a fragmentary transverse sectional view taken along the line 29–29 of FIG. 28 and shows further the details of the valve.

Figure 5:
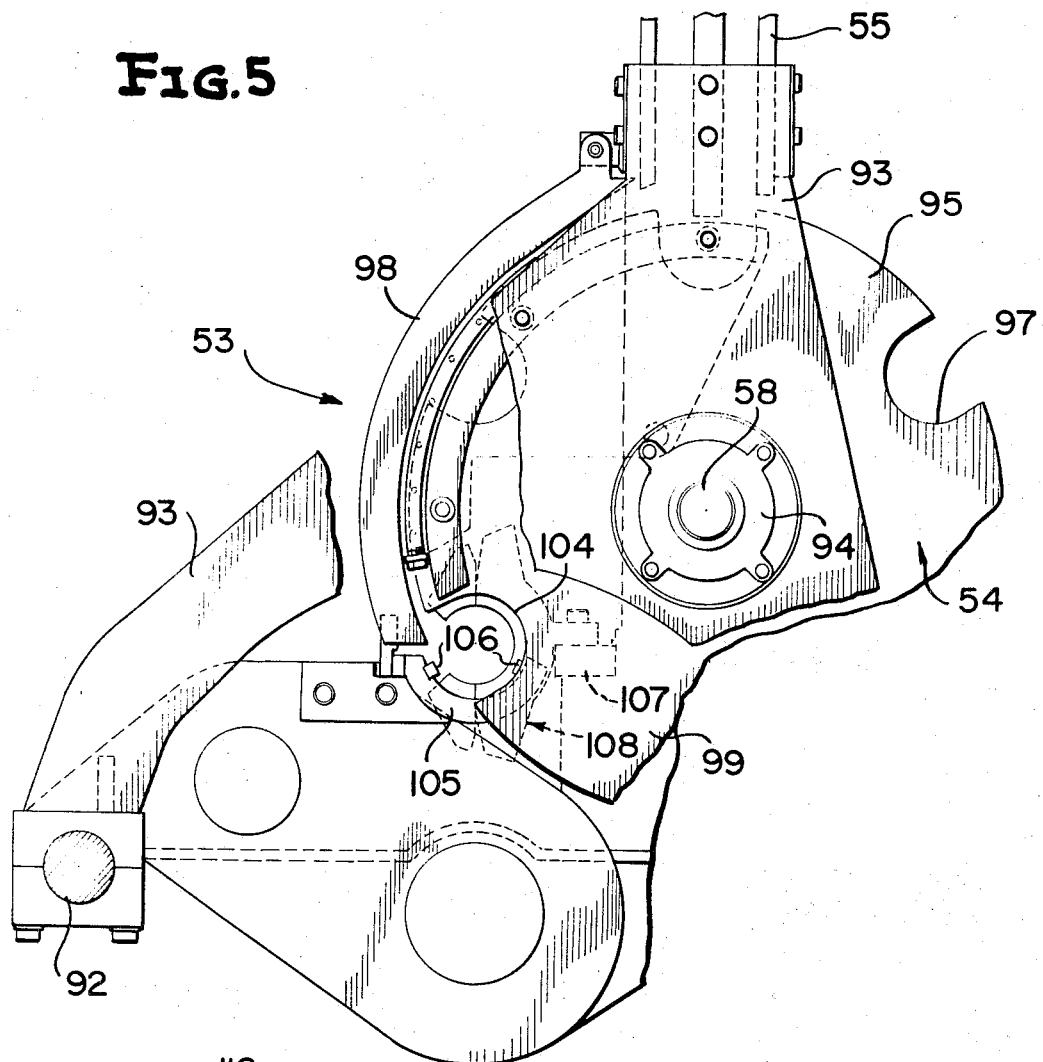
FIG. 5 is an enlarged fragmentary transverse vertical sectional view taken along the 5–5 of FIG. 4 and shows further the details of the machine.

Referring now to the drawings in detail, it will be seen that there is illustrated in FIG. 1 the basic components of the machine, which is the subject of this invention, the machine being generally referred to by the numeral 30. In order that the structural details of the machine may be readily understood, the basic functions of the machine will be set forth here.

Tubular members having closed ends which have been formed by either extrusion or wall ironing processes or combinations of the two are first fed into the machine and then inserted into individual holders of the turret thereof. As the turret is sequentially rotated and indexed, each tubular member is first inspected for possible backward orientation, after which the normally flat end thereof is panelled so as to be inwardly recessed. The tubular member is then trimmed at its open end so that it is of the desired length. It may now be said that the tubular member is in the form of an unflanged can. Next the open end of the can is flanged, after which the can is retracted from the can holder and removed from the machine.

The machine 30 has a specific frame construction which in itself is not a feature of this invention and which is not specifically shown in detail in the drawings. The frame supports a suitable power unit in the form of an electric motor 31. The electric motor 31 has an armature shaft 32 on which there is mounted a drive pulley 33. The drive pulley 33 is aligned with a driven pulley 34 and a drive belt or chain 35 is entrained over the pulleys 33 and 34 to drivingly connect the two together. The driven pulley 34 is carried by a transverse shaft 36 which is suitably journaled in the frame of the machine. The shaft 36 is connected to a right angle drive unit 37 which has an output shaft 38. The output shaft 38 is connected to a longitudinal drive shaft 39 by means of a coupling 40. The opposite end of the longitudinal drive shaft 39 is provided with a drive sprocket 41 which is aligned with a driven sprocket 42 and which is connected thereto by means of a drive chain 43. The desired tension on the chain 43 is maintained by an idler sprocket 44. The sprocket 42 is mounted on an input shaft 45 of a drive unit 46 of a conventional type of Ferguson drive unit 47. The Ferguson drive unit is a drive unit having an output shaft 48 which is sequentially rotated at regular intervals so as to be automatically periodically indexed. The shaft 48 passes through a backup plate 49 which is rigidly mounted in closely spaced relationship in front of the Ferguson drive unit on the machine frame.

A turret plate 50 is carried by the output shaft 48 for movement therewith. It will be understood that the turret plate 50 will automatically be indexed by the Ferguson drive unit 47.

The turret plate 50 is a part of a turret, which is generally referred to by the numeral 51. The turret 51 includes a plurality of work holders, each of which is referred to by the numeral 52, which are equally spaced about the axis of the output shaft 48.

In order that tubular members may be automatically positioned in the work holders 52 and the cans formed therefrom automatically removed from the work holders, the machine 30 includes a feed mechanism which is generally referred to by the numeral 53. The feed mechanism 53 includes a feed turret 54. The feed turret 54 has associated therewith an infeed chute 55 and a discharge chute 56. The backup plate 49 has a support 57 thereon in which one end of a feed turret drive shaft 58 is suitably journaled. The feed turret drive shaft 58 is driven by an output shaft gear 59 on the output shaft 48 through an intermediate gear 60 and a feed turret drive shaft gear 61.

The machine 30 includes a tool holder which is generally referred to by the numeral 62 and which is generally axially aligned with the turret 51. The tool holder 62 includes a suitable carriage 63 having slides 64 which are mounted for movement axially of the machine only in suitable guides or ways 65.

In order that the tool holder 62 may be reciprocated towards and away from the turret 51, the machine 30 includes a crankshaft 66. The crankshaft 66 is provided at one end thereof with a driven gear 67 that is relatively large and which is driven from the transverse drive shaft 36 by means of a small drive gear 68 carried by the transverse drive shaft. The opposite end of the crankshaft 66 is provided with a control unit drive sprocket 69, the function of which will be described in more detail hereinafter.

It is to be noted that the crankshaft 66 has two journals or throws 70 which are mounted in alignment and which have connected thereto ends of connecting rods 71. The opposite ends of the connecting rods 71 are suitably coupled to the carriage 63. It thus will be apparent that the carriage 63 will be longitudinally reciprocated by the rotation of the crankshaft 66.

At this time it is pointed out that the tool holder 62 is particularly configurated to support a plurality of tools which will not be described here, but will be described in the order of their use hereinafter.

In addition to the tools carried by the tool holder 62, the machine 30 also includes a trimmer, which is generally referred to by the numeral 72. The trimmer 72 is mounted on a carriage 73 which, in turn, is mounted in a pair of opposed guides or ways 74 for movement longitudinally of the machine 30 only.

In order that the trimmer 72 may be reciprocated longitudinally, there is provided a cam 75 which is carried by a shaft 76 that extends transversely of the machine 30 and is suitably journaled with respect to the frame of the machine 30. The shaft 76 has a sprocket 77 which is aligned with a sprocket 78 carried by an output shaft 79 of the Ferguson unit 47. It is to be understood that the output shaft 79 is driven continuously and not intermittently, as is the output shaft 48. A drive chain 80 couples the drive sprockets 77 and 78 together so that the shaft 76 is driven from the shaft 79.

The drive for effecting the longitudinal reciprocation of the trimmer 72 also includes a suitable bellcrank structure 81 which is mounted on a transversely pivot shaft 82. One end of the bell crank 81 carries a cam follower 83 which is positioned within a cam track 84 formed in the cam 75. The opposite end of the bell crank 81 is connected to the carriage 73 by a link 85. It will be readily apparent that when the cam 75 is rotating, the bell crank 81 is constantly oscillated in a rocking manner so as to reciprocate the carriage 73 longitudinally of the machine.

The trimmer 72 is driven by means of an electric motor 86 having an armature shaft 87. The armature shaft 87 has a drive pulley 88 which is aligned with a driven pulley 89 carried by a shaft 90 of the trimmer. The pulleys 88 and 89 are coupled together by a drive belt 91. It is pointed out that the electric motor 86 is suitably mounted on the frame of the machine 30 in a fixed position despite the fact that the trimmer 72 reciprocates longitudinally of the machine 30.

Figure 6:
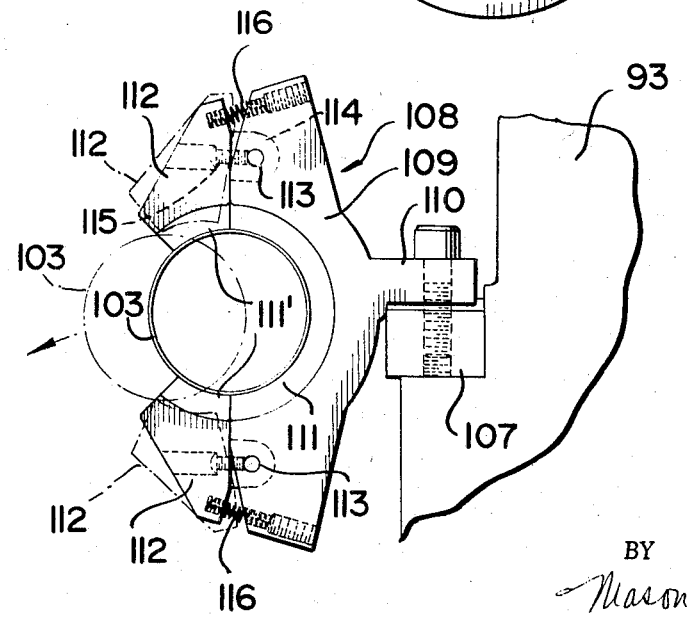
FIG. 6 is an enlarged fragmentary vertical sectional view taken along the line 6–6 of FIG. 4 and shows the specific details of a guide for automatically guiding a tubular member into a holder of the turret, the guide being capable of releasing the tubular member upon rotation of the turret.

Referring now to FIGS. 4, 5 and 6, in particular, it will be seen that there are illustrated the details of the feed mechanism 53. It is first pointed out that the frame of the machine 30 includes a pair of longitudinal support rods 92 which are elevated above the ways 65. A suitable frame structure 93 for the feed mechanism 53 is carried by the support rods 92. The frame structure 93 carries suitable bearings, such as the bearing 94 shown in FIG. 5, in which the feed turret drive shaft 58 is rotatably journaled. The feed turret 54 includes a pair of plates 95 which are fixedly secured to the shaft 58 and which are spaced longitudinally thereof. The plates 95 are connected together at circumferentially spaced intervals by means of spacers 96. As is best illustrated in FIGS. 1 and 5, the plates 95 are notched in their peripheral edges to define pockets 97, the notches in the two plates 95 being aligned.

In order that tubular members delivered to the feed turret 54 will not drop out of the pockets 97 during the rotation of the turret 54 in a counterclockwise direction as viewed in FIG. 1, a pair of guides 98 depend from the frame structure 93. Also, in order to assure that the tubular members placed within the feed turret 54 are properly positioned therein, the frame structure 93 is provided with a pair of fixed end plates 99 and 100, the end plate 99 being disposed adjacent the turret 51 while the end plate 100 is disposed adjacent the tool holder 62. In addition, there is carried by the frame structure 93 an air pipe 101 having a plurality of nozzles 102 which generally face the end plate 99 and which are aligned with the path of movement of the pockets 97. When the tubular members are properly positioned within the feed turret 54, the open ends thereof will open towards the nozzles 102 and air will be directed into the tubular members so as to force the tubular members against the end plate 99. In this manner, the tubular members are axially positioned in the feed turret 54. For reference purposes, the tubular members are referred to by the numeral 103.

At this time it is pointed out that a suitable gate structure operative to shut off the delivery of tubular members when desired will be provided at the lower end of the infeed chute 55. However, the gate structure may be of any desired design and will not be described further herein.

It will be readily apparent from FIG. 1 that the feed turret 54 will be rotated at the same rate as the turret 51. Furthermore, it is to be understood that the pockets 97 will be sequentially aligned with the holders 52. Inasmuch as the turrets 51 and 54 are indexed, it is to be understood that the turrets will be stationary at the time the tubular members 103 are transferred from turret 54 to turret 51.

The plate 99 has an opening 104 through which a tubular member 103 is fed into a respective one of the holders 52. The lower portion of the opening 104 is defined by an arcuate member 105 which is suitably fastened to the plate 99 and which carries a pair of tubular member engaging slide strips 106. In this manner, a tubular member 103 is supported as it is passed through the opening 104 in the plate 99.

The frame structure 93 includes a longitudinally extending support bar 107 on which there is mounted a guide structure 108 for guiding a tubular member 103 from the feed turret 54 into one of the holders 52. The guide structure 108 includes a fixed guide member 109 having a mounting flange 110 which is suitably secured to the support bar 107. The fixed guide member 109 has a circular guiding surface 111 which extends approximately 180°.

The guide structure 108 also includes a pair of pivotally mounted guide members 112 which are carried by the fixed guide member 109. Each pivotally mounted guide member 112 is carried by a rockshaft 113 which has an ear 114. A fastener 115 secures the pivotally mounted guide member 112 to the ear 114. A spring 116 extends between the fixed guide member 109 in each pivotally mounted guide member 112 to resiliently resist the outward swinging of each pivotally mounted guide member 112.

It is to be noted that each pivotally mounted guide member 112 also has a tubular member guiding surface 111' which forms a continuation of the guiding surface 111. It is also to be noted that the guiding surfaces 111 and 111' are outwardly flared towards the feed turret 54 to facilitate the entrance of a tubular member 103 into the guide structure 108. As is clearly shown in FIG. 7, when a tubular member 103 is fully positioned in a work holder 52, it projects from the work holder 52 and has a portion thereof disposed within the guide structure 108. When the turret 51 is indexed to move the tubular member 103 in the direction of the arrow in FIG. 6, it will be seen that the guide structure 108 opens up, due to the pivoting of the pivotally mounted guide members 112, to completely release the tubular member 103.

Reference is now made to FIGS. 8 through 11 wherein there are shown the specific details of a work holder 52 and the manner in which the same is mounted on the turret plate 50. Each work holder 52 includes a die holder 117 which extends through an opening 118 in the turret plate 50 towards the Ferguson drive unit 47. The die holder 117 is provided with a mounting flange 119 which is secured to the base of the turret plate 50 remote from the Ferguson drive unit 47 by a plurality of circumferentially spaced fasteners 120. In order to properly position the die holder 117 with respect to the turret plate 50, a suitable fitting spacer 121 is positioned between the mounting flange 119 and the turret plate 50.

Figure 8:
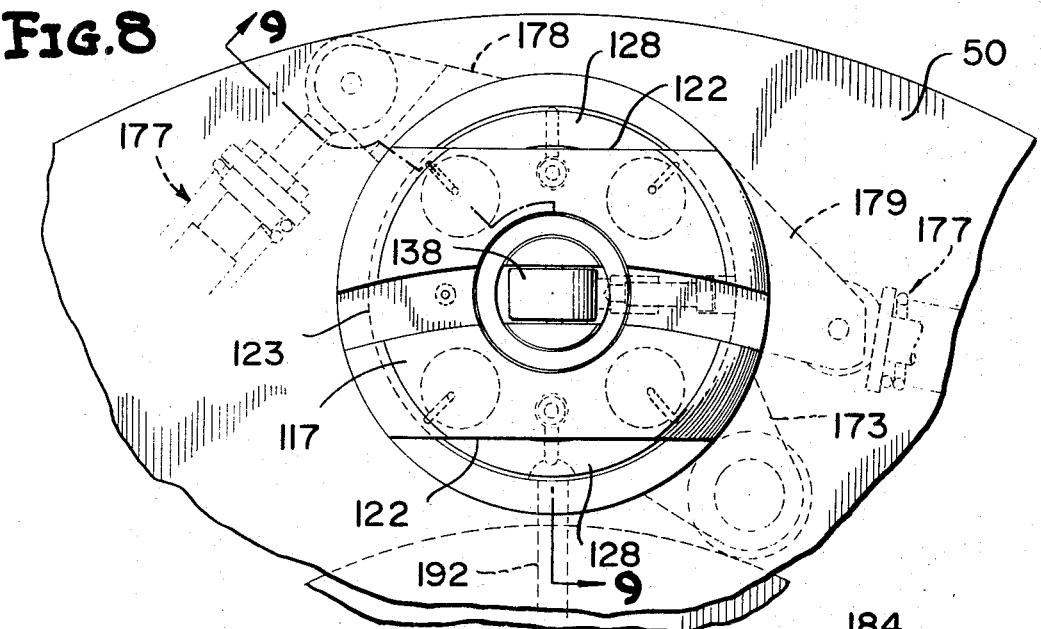
FIG. 8 is an enlarged fragmentary elevational view of the turret taken from the left in FIG. 1 and shows the specific details of one of the holders thereof.

Referring now to FIG. 8 in particular, it will be seen that the die holder 117 is part circular in outline and has a pair of flat sides 122. It is also provided with an arcuate groove 123 through the center thereof. The purposes of the flat forced 122 and the groove 123 will be set forth in detail hereinafter.

It is to be noted from FIG. 11 that the die holder 117 is primarily cup-shaped in outline and has seated therein a draw ring 124. The draw ring 124 is mounted for movement axially in the die holder 117 and is resiliently urged away from the Ferguson drive unit 47 by four circumferentially spaced springs 125 (FIG. 9) which are seated in sockets 126 and 127 formed in the die holder 117 and the draw ring 124, respectively.

It is to be noted that the draw ring 124 is in part shaped to be received within the die holder 117 and in part to define edge portions 128 which project outwardly of the flat sides 122 of the die holder 117. The configuration of the draw ring 124 is such as to define a shoulder 129 which is adapted to abut a shoulder 130 of the die holder 117 to limit the movement of the draw ring 124 to the left, as viewed in FIG. 9.

The draw ring 124 is of a hollow construction and includes a first opening or bore 131 of a size to receive the closed end portion of a tubular member 103. At the inner or left end of the opening 131 there is a shoulder defining a seat 132 for a tubular member. The draw ring 124 includes a second opening or bore 133 in which there is recessed a head 134 of a die pad 135. The die pad 135 includes a stem 136 which extends entirely through the draw ring 124 and into the arcuate groove 123 of the die holder 117.

The stem 136 has a left or outer end of a bifurcated configuration defining a slot 137 which is aligned with the groove 123 and which has seated therein a cam follower 138. The cam follower 138 is rotatably journaled on a shaft 139 which extends across the slot 137. It is to be noted that the cam follower 138 is aligned with the groove 123. It is to be further noted in FIGS. 9 and 11 that the bifurcated end of the stem 136 extends leftwardly beyond the periphery of the cam follower 138 a slight amount.

Figure 9:
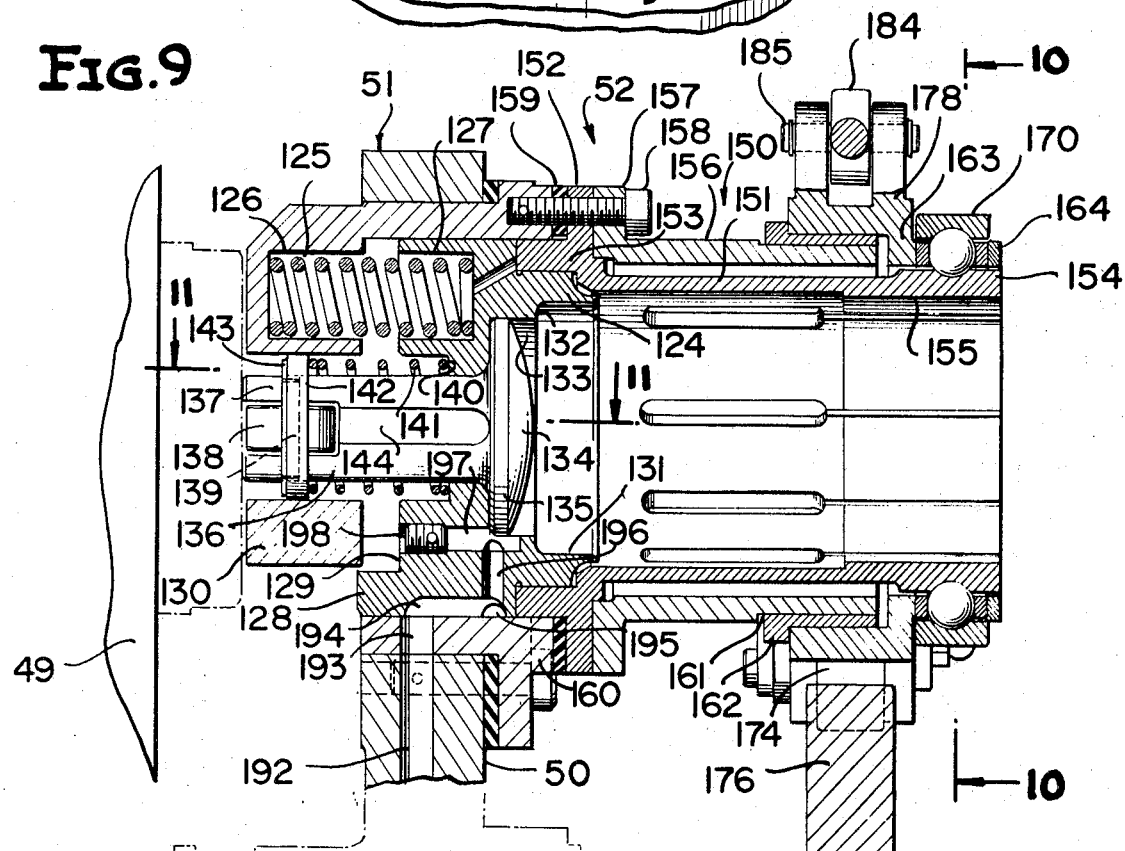
FIG. 9 is an enlarged fragmentary longitudinal sectional view taken along the line 9–9 of FIG. 8 and shows the specific details of the holder and the relationship thereof with respect to the turret, a collet actuating cam and a backing block.

The draw ring 124 has a shoulder 140 which faces to the left in FIG. 9. The shoulder 140 is engaged by a spring 141 which is carried by the stem 136 of the die pad 135, and which engages a spring retainer 142 which is locked in place on the stem 136 by means of a retainer ring 143.

It is to be noted that the spring 141 serves to normally hold the head 134 fully seated within the opening 133 while the springs 125 normally serve to hold the shoulders 129 and 130 in widely spaced relation. Rotation of the die pad 135 within the draw ring 124 is prevented by providing the stem 136 with a longitudinal keyway 144 in which there is seated a key 145 (FIG. 11). The key 145 is carried by the draw ring 124 and is secured in place thereon by means of a fastener 146.

The draw ring 124 is also fixed against rotation by means of a pin 147 which is carried by the die holder 117. The pin 147 is received within a bore 148 in the draw ring 124, as is clearly shown in FIG. 11. It is to be understood that the pin 147 has a flat side 149 which permits the venting of the bore 148 while still preventing relative rotation of the draw ring 124 with respect to the die holder 117.

Each work holder 52 also includes a collet assembly which is generally referred to by the numeral 150. The collet assembly 150 includes a collet body 151 which is provided with an outwardly projecting mounting flange 52. It is to be noted that the collet body 151 has a projecting portion 153 which is generally complementary to the adjacent portion of the draw ring 124 so that the two will internest. It is also to be noted that the projecting portion 153 functions as a stop for the draw ring, as is clearly shown in FIG. 9, to limit the movement of the draw ring to the right due to the urging of the springs 125. It is to be noted that the collet body 151 is of the usual split construction so as to define a plurality of individual circumferentially spaced fingers 154. Each finger 154 has an inner surface 155 which is aligned with the opening 131 in the draw ring 124. Thus, when a tubular member 103 is positioned within the work holder 152, it will be supported by the draw ring 124 and by the inner surfaces 155.

The collet assembly 150 also includes a tubular housing 156. The housing 156 has a mounting flange 157 which extends outwardly. It is to be noted that a single set of fasteners 158 secure the housing 156 and the collet body 151 to the die holder 117. At this time, it is also pointed out that there is provided a fitting spacer 159 which is positioned between the mounting flange 152 and a projecting mounting ring 160 of the die holder 117 into which the fasteners 158 are threaded.

A terminal portion of the housing 156 is recessed so as to define a journal 161 on which there is rotatably journaled a bushing 162. The housing 156 also serves as a support for a collet clamping ring 163 which has the bushing 162 pressed in and which rotates relative to the housing 156 in order to effect the clamping together and the releasing of the fingers 154 in a manner to be described hereinafter.

The collet clamping ring 163 has a radially inwardly offset ring portion 164 which surrounds the outer ends of the fingers 154 in closely spaced relation thereto. The ring portion 164 is interrupted at circumferentially spaced points to define openings 165, each opening 165 being aligned with one of the collet fingers 154, as is clearly shown in FIG. 10. In each opening 165, there is positioned a bushing 166 which carries a rolling element which is illustrated as being in the form of a ball 167. Each ball 167 is disposed in a circumferentially extending groove 168 in the associated collet finger 154. It is to be noted from FIG. 10 that each groove 168 increases in depth in a counterclockwise direction, so as to define a sloping cam surface 169. Thus, when the balls 167 are moved in a clockwise direction, as viewed in FIG. 10, the collet fingers 154 will be urged inwardly. When the balls 167 are moved in a counterclockwise direction, the collet fingers 154 will be released. Inasmuch as the collet body 151 is formed of a suitable resilient metal, it will be understood that the fingers 154 automatically return to their outer normal positions.

The balls 167 are retained in place by means of a ring 170. The ring 170 is provided with an annular groove 171 which is shaped in accordance with the configuration of the balls 167 and forms an outer raceway for the balls 167. At this time it is pointed out that the collet fingers 154 are provided along their line of juncture with cutout portions defining a generally semicircular groove 172 which extends longitudinally of the collet fingers 154. The groove 172 initially receives the balls 167 to facilitate the assembling of the collet clamping ring 163 and the associated components over the collet body 151.

Referring once again to FIG. 10 in particular, it will be seen that each collet clamping ring 163 is provided with three bifurcated ear assemblies. The first of these ear assemblies is an ear assembly 173 which carries a cam follower 174, the cam follower being carried by a shaft assembly 175 suitably mounted in the ear assembly 173. The cam follower 174 engages a fixed cam 176 which is suitably supported by the frame of the machine 30. It is to be understood that the general axis of the cam 176 is coaxial with the axis of rotation of the turret 51 and a major portion of the surface of the cam 176 is concentric to this axis so that the collet clamping ring 163 may normally be retained in a finger clamping position.

The collet clamping ring is constantly urged towards a finger clamping position by means of a spring assembly which is generally referred to by the numeral 177. The spring assembly 177, as viewed in FIG. 10, urges a collet clamping ring in a generally clockwise direction and serves to hold the cam follower 174 against the surface of the cam 176. It will, thus, be apparent that the cam 176 is relied upon to rotate the collet clamping ring 163 in a counterclockwise direction against the urging of the spring assembly 177 to a finger releasing position. In other words, the spring assembly 177 urges the collet clamping ring 163 to the clamping position and the cam 176 serves to move the collet clamping ring to a released position. Thus, with proper configuration of cam 176, tubular members 103 are clamped or released as required for performing the several operations thereon.

The spring assembly 177 extends between a second of the three above-mentioned ear assemblies and a third of the above-mentioned ear assemblies, the third ear assembly being carried by the collet clamping ring 163 of an adjacent work holder 52. The second ear assembly, which is of a bifurcated configuration, is referred to by the numeral 178 and is positioned generally diametrically opposite to the ear assembly 173. The third ear assembly, which is referred to by the numeral 179, is also of a bifurcated configuration and is positioned adjacent the ear assembly 173, but spaced in a counterclockwise direction therefrom, as viewed in FIG. 10.

Each spring assembly 177 includes a spring bushing 180 which is of a tubular construction. The spring bushing has an end portion into which there is threaded a rod end 182. The rod end 182 is received in the ear assembly 179 and is pivotally connected thereto by means of a pin 183.

A second rod end 184 is carried by the ear assembly 178 and is pivotally connected thereto by means of a pin 185. The rod end 184 has a threaded shank 186 which is threadedly engaged in a tubular spring compressor 187. The spring compressor 187 is retained on the shank 186 in an adjusted position by means of a lock nut 188. The spring compressor 187 is telescoped within the spring bushing 180 and has a spring seating flange 189 opposing a spring seating flange 190 on the spring bushing 180. A spring 191 is telescoped over the spring bushing 180 and the spring compressor 187 and urges the two apart so as to urge the collet clamping ring 163 in a clockwise direction, as viewed in FIG. 10.

Referring once again to FIGS. 8 and 9 in particular, it will be seen that for each of the work holders 52 the turret plate 50 has a radially extending passage 192 which is aligned with a passage 193 in the die holder 117. The draw ring 124 has an elongated passage 194 in the outer surface thereof which is aligned with the passage 193 and remains in communication therewith in all positions of the draw ring 124. The draw ring 124 has an annular passage 195 in the outer surface thereof which intersects the passage 194. A pair of radial passages 196 extend inwardly from the passage 195 in diametrically opposite relation. Each radial passage 196 intersects a longitudinal passage 197 which opens into the opening 133. It is to be noted that the left end of each longitudinal passage 197 is closed by means of a plug 198. The passages 192 are placed in communication with a vacuum source in preselected positions of the work holder 52 in its travel with the turret 51 by means of a valve assembly which is generally referred to by the numeral 199 and is best illustrated in FIGS. 28 and 29.

Referring now to FIG. 28 in particular, it will be seen that the turret plate 50 is secured to the output shaft 48 by means of a mounting flange 200 on the output shaft. The turret plate 50 has a hub 201 which mounts the mounting flange 200 and which is removably secured thereto by headed bolts 202. The bolts 202 are recessed within axial bores 203 in the turret plate 50. It is to be noted that each of the passages 192 radiating outwardly through the turret plate 50 opens into one of the bores 203.

The valve assembly 199 includes a plate 204 which is clamped to the face of the turret plate 50 by a plurality of bolts 205. A suitable gasket ring 206 may be placed between the plate 204 and the turret plate 50 to provide a seal therebetween.

The plate 204 is provided with a longitudinal passage 207 and an intersecting radial passage 208 for each of the work holders 52. The outer end of the radial passage 208 is closed by means of a plug 209. Each passage 208 is circumferentially aligned with an associated passage 192, but is longitudinally offset therefrom, as is clearly shown in FIG. 28. The plate 204 is provided with an internally threaded bore 210 therethrough in alignment with each of the bores 203, the bore 210 intersecting the passage 208. In each bore 210 there is threaded a plug 211 which is sealed relative to the plate 204 and which has a circumferential groove 212 that is aligned with the passage 208. Each plug 211 is provided with a center bore 213 which is filled with a suitable filter material and an intersecting radial passage 214 which opens into the groove 212. It is to be noted that the bore 213 is in direct communication with the bore 203 so that the passage 208 is in communication with the passage 192.

A further plate 215 is tightly clamped against the face of the plate 204 by a plurality of fasteners 216. The plate 215 has passages 217 therethrough in alignment with the passages 207.

A valve block 218 is clamped against the face of the plate 215, but is fixed against rotation with the plate 215. The valve block 218 may be formed of any suitable material although a suitable plastic, such as Teflon, is preferred. The valve block 218 is supported from the cam 176 by means of a plurality of bolts 219 which are carried by the cam 176. Each bolt 219 is locked in place by means of a nut 220 and projects into a bore 221 in the valve block 218. A spring 222 is carried by each bolt 219 and bears at one end against the nut 220 and at the opposite end against the valve block 218. In this manner, the valve block 218 is prevented from rotating with the plate 215 and at the same time is resiliently clamped thereagainst.

The machine 30 includes a vacuum line 223 which is connected to a suitable vacuum source (not shown). One end of the vacuum line 223 is threaded into a bore 224 in the valve block 218 with the bore 224 opening into an arcuate port 225 which is best shown in FIG. 29.

It is to be noted that the port 225 has a sufficient arcuate extent so as to extend between two indexed positions of the turret 51. The port 225 is so positioned whereby the vacuum line 223 is in communication with the passages in the work holders 52 when the work holders are at the panelling and trimming stations which are to be described in more detail hereinafter.

In FIG. 28 there is illustrated a tubular support 227 which is a part of the frame of the machine 30. The tubular support serves to support the cam 176, which cam is secured to a flange 228 of the support 227 by a plurality of circumferentially spaced bolts 229.

Reference is now made to FIGS. 4 and 7 wherein it is shown that the tool holder 62 is provided with a suitable support structure 230 which includes a clamping sleeve 231 having a longitudinal axis. The support structure 230 is disposed at the top of the carriage 62 in a 12 o'clock position when facing the carriage 62 from the turret 51.

The clamping sleeve 231 carries a feed plunger assembly which is generally referred to by the numeral 232. The feed plunger assembly 232 includes a supporting rod 233 and a head 234. The head 234 is secured to the rod 233 by means of a centrally located bolt 235 and is prevented from rotating with respect to the rod by a pin 236.

It is to be noted from FIG. 7 that the left end of the head 234 is beveled as at 237 to facilitate the entrance of the head 234 into a tubular member 103. The left portion of the head 234 is of a diameter to be freely received within the open end of the tubular member 103. The right portion of the head 234 is larger than the left portion so as to define a shoulder 238 against which the open end of the tubular member 103 abuts and is grooved out on both sides (see FIG. 4) to clear the slide strips 106 shown in FIG. 5.

INFEEDING OPERATION

The closed end tubular members 103 are delivered to the machine 30 through the infeed chute 55 and as each pocket 97 of the feed turret 54 is disposed uppermost, a tubular member 103 is seated therein. The infeed turret is indexed in a clockwise direction, as viewed in FIG. 3, and when a pocket reaches approximately the 4 o'clock position, the pocket becomes aligned with the feed plunger assembly 232. At the same time, the pocket in question is aligned with one of the work holders 52. When the feed turret 54 and the turret 51 are indexed, the tool holder 62 moves forwardly with the result that the tubular member 103 positioned at the 4 o'clock position of the feed turret 54 is engaged by the feed plunger assembly 232. As the tool holder 62 continues to advance, the tubular member 103 is pushed through the guide structure 108 into the aligned work holder 52, as is clearly shown in FIG. 7.

After the tubular member 103 has been positioned in the work holder 52 which is disposed at the 12 o'clock position of the turret 51 of FIG. 3, the feed plunger assembly 232 is withdrawn due to the withdrawal of the tool holder 62. The work holder 52 having the tubular member 103 therein is then indexed in a clockwise direction, as viewed in FIG. 3, to a 2 o'clock position.

It is to be understood that the work holder 52 is maintained in a wide open position for easy reception of the tubular member by virtue of the elevation of the cam surface of the cam 176 being sufficient at the infeeding area to effect the opening thereof. During the clockwise movement of the work holder to the 2 o'clock position, however, the cam surface of the cam 176 falls off sufficiently so that the tubular member is lightly gripped for the following operation.

BACKWARD MEMBER DETECTING APPARATUS

Referring now to FIG. 12 in particular, it will be seen that there is carried by the tool holder 62 suitable apparatus for detecting when a tubular member is positioned within the associated work holder 52 in a backward direction. This apparatus is generally referred to by the numeral 239 and includes a tubular plunger 240 which has a rear extension 241 seated in an opening 242 in the tool holder. The plunger 240 has a mounting flange 243 which is secured to the tool holder 62 by means of a plurality of bolts 244. A fitting spacer 245 is disposed between the mounting flange 243 and an adjacent face of the tool holder 62 so as to provide for the proper adjustment of the plunger 240.

It is to be noted that the plunger 240 has a rounded projecting end 246 to facilitate the movement of the plunger 240 into a tubular member 103 carried by the aligned work holder 52.

The apparatus 239 is provided with means for detecting when a tubular member 103 is in the work holder backwards. To this end, the plunger 240 has a bore 247 therethrough which includes an enlarged central portion 248. A shaft 249 extends entirely through the plunger 240 and is provided at the left end thereof, as viewed in FIG. 12, with a head 250. The opposite end of the shaft 249 extends out beyond the right end of the plunger 240 and terminates in a flattened end portion 251 to which there is connected by means of a fastener 252 one end of a lever 253. The lever 253 is in the form of a control arm of a switch 254 which is suitably mounted on the tool holder 62 by means of a bracket 255. The switch 254 is suitably coupled into the electrical system of the machine 30 so as to discontinue the operation thereof when it is tripped by the movement of the shaft 249 to the right.

The enlarged central portion 248 of the plunger 240 has a coil spring 256 positioned therein. The coil spring 256 has one end thereof bearing against a stop collar 257 carried by the shaft 249 and adjustably retained thereon by means of a set screw 258. The spring 256 constantly urges the shaft 249 and the head 250 to the left. When the head 250 strikes a relatively immovable object, such as the end panel 260 of a backward tubular member 103, the shaft 249 will move to the right thereby actuating the switch 254. At this time it is pointed out that in order to position the spring 256 on the collar 257 within the plunger 240, the plunger may be of a split construction either longitudinally or transversely. This has not been specifically illustrated inasmuch as it is a mere constructional detail.

PANELLING APPARATUS

Referring now to FIG. 3 in particular, it will be seen that the tool holder, when viewed from the turret, has a panelling apparatus disposed at the 4 o'clock position, the panelling apparatus being generally referred to by the numeral 259. The panelling apparatus is for the purpose of panelling the end panel 260 (FIG. 13) of the closed end tubular member.

Referring now to FIG. 13 in particular, it will be seen that the tool holder 62 supports the panelling apparatus 259 in a projecting cantilever manner. The panelling apparatus includes a plunger 261 having a rear extension 262 which is seated within an opening 263 in the tool holder 62. The plunger 261 also includes a mounting flange 264 which is secured to the tool holder 62 by means of a plurality of bolts 265. It is to be noted that a fitting spacer 266 is positioned between the mounting flange 264 and the opposing face of the tool holder 62 so that the panelling apparatus 259 may be properly adjusted.

The plunger 261 has a large bolt 267 threaded into a bore 268 formed therein and opening through the end thereof remote from the tool holder 62. The bolt 267 has a shoulder 269 which abuts against a spacing ring 270 which is clamped against the end of the plunger 261. The bolt 267 carries a punch 271 which has a hollow end portion 272 in which the head 273 of the bolt 267 is positioned, the head 273 abutting a shoulder 274 of the punch to retain the punch generally in place. It is to be noted that the punch 271 has an outer ring portion 275 which is formed complementary to the seat 132 of the draw ring 124. It is also to be noted that the bolt head 273 is sufficiently recessed within the punch 271 to permit the head 134 of the die pad to inwardly deform the end panel 260.

The mounting of the punch 271 on the plunger 261 is a resilient one with the punch 271 being free for limited sliding movement on the bolt 267 towards the plunger 261. To this end, there is carried by the bolt 267 intermediate the punch 271 and the spacing ring 270 a plurality of Belleville washers 276 which have limited compressibility. It is pointed out that after the punch 271 has been properly positioned on the plunger 261 and the desired adjustment obtained, the bolt 267 is clamped against rotation relative to the plunger 261 by means of a set screw 276' which is threaded in a bore 278 in the plunger 261.

It is to be noted that the plunger 261 is provided with a longitudinal passage 277 which is plugged at the right end thereof by means of a plug 278. In a like manner, the bolt 267 has a passage 279 entirely therethrough. The passage 279 opens into the hollow end portion 272 of the punch 271 and is in communication with the end panel 260 of the tubular member 103. The plunger 261 also includes a transverse passage 280 which opens into the passage 277. A compressed air supply line 281 is connected to the plunger 261 by means of a fitting 282 threaded into the passage 280. For descriptive purposes, the compressed air will be described as continuously flowing through the passage 280, 277 and 279. However, it will be readily apparent that if desired, suitable valving may be provided so as to eliminate the flow of air except when the air is needed to strip a can from the punch 271 after a panelling operation.

It is to be noted that the backup plate 49 in front of the Ferguson drive unit has secured thereto a plate 283. In turn, the plate 283 carries a backup pad 284. The backup pad 284 is disposed in alignment with the 4 o'clock position of the panelling apparatus 259 shown in FIG. 3. The backup pad 284 is so positioned with respect to the path of movement of the turret plate 50 so as to be very closely spaced to the path of travel of the die holder 117 and the bifurcated end of the stem 136.

OPERATION OF PANELLING APPARATUS

When a work holder 52 is indexed so as to be aligned with the backup pad 284, the panelling apparatus 259 is moved towards the tubular member 103 mounted in the work holder, the punch 271 will enter into the open end of the tubular member 103 and continue thereinto to firmly seat the tubular member 103 against the draw ring 124. At this time the ring portion 275 of the punch 271 will clamp the outer peripheral portion of the end panel 260 against the seat 132 of the draw ring 124. As the panelling apparatus 259 continues to move into the work holder 52, the end panel 260 will come into contact with the head 134 of the die pad 135. The die pad 135 will move rearwardly a slight amount until the bifurcated end of the stem 136 comes into contact with the backup pad 284. The movement of the die pad 135 to the left in FIG. 13 then discontinues and further movement of the punch 271 and the associated draw ring 124 will result in the inwardly recessing or panelling of the end panel 260 in the manner clearly shown in FIG. 13. It is to be noted that as the draw ring 124 moves to the left, the spring 141 and the springs 125 (FIG. 9) are compressed.

When the tool holder 62 moves to the right in FIG. 13, the tubular member 103 has a tendency to be withdrawn therewith. However, by supplying compressed air into the interior of the tubular member with the compressed air reacting against the end panel 260, it will be readily apparent that the panelling apparatus 259 may be stripped from the tubular member 103 with the tubular member remaining in place within the work holder 52. There is, however, a limited outward movement of the tubular member 103 due to the urging of the spring 141 and springs 125 (FIG. 9) and the returning of the draw ring 124 to its normal at rest position.

It is also pointed out that at this time a vacuum is being drawn into the die holder 117 and the draw ring 124 through the passage 192 in the turret plate 50. The drawing of this vacuum further aids in maintaining the cans in place during the stripping of the tubular member 103 from the panelling apparatus 259 to assure proper location for the subsequent trimming operation.

The Belleville washers 276 take up the shock that would be applied to the punch 271 in the event that an undetected crushed can remained in the holder 52 from a previous abortive operation. The tubular member 130 will be only very lightly gripped in the work holder 52 during the panelling operation, this being accomplished by the elevation of the cam surface of the cam 176 at the panelling area being the proper amount to effect a very light gripping action by the work holder 52. This permits the tubular member to slide in the holder rather freely during the panelling operation.

Referring once again to FIG. 3 in particular, it will be seen that when the turret 51 is next indexed, the work holder carrying the tubular member on which the panelling operation had just taken place is moved to a 6 o'clock position in alignment with the trimming apparatus 72. As will be apparent from the following description of the trimming apparatus 72, it is essential that the tubular member 103 be properly positioned axially within the work holder 52. In view of the fact that in some instances the return of the draw ring 124 is not complete, and since the position of the draw ring 124 controls the position of the tubular member 103 in the work holder 52, it is desired that the position of the draw ring 124 be checked before the end of the tubular member 103 is trimmed and to stop the operation of the machine 30 if the draw ring 124 has not returned to its normal position.

DRAW RING RETURN SAFETY SWITCH

Referring now to FIGS. 14 through 17, it will be seen that the backup plate 49 in front of the Ferguson drive unit is provided with a backup pad unit 285 in alignment with the trimming station of the machine. The backup pad unit 285 includes a suitable spacer 286 having a pad or plate 287 secured thereto. The pad or plate 287 has an outwardly projecting central portion 288 and slightly recessed edge portions 289 and 290.

A finger 291 is mounted on the edge portion 289 for swinging movement by means of a pivot pin 292. As is clearly shown in FIG. 14, the finger 291 has a flat surface 293 which is normally aligned with the line of juncture between the edge portion 289 and the central portion of the pad 287. The finger 291 is normally retained in the position shown in FIG. 14 by means of a spring 294 which has one end thereof seated in the finger 291 and the opposite end thereof seated in a bracket 295 which is secured to the edge portion 289. It will be readily apparent from FIGS. 14 and 16 that the finger 291 may be swung towards the bracket 295 against the urging of the spring 294 in the event the finger 291 is engaged by a projecting portion of a work holder 52.

A second finger 296 is carried by the edge portion 290 for pivotal movement, the finger 296 being mounted on a suitable pivot pin or shaft 297. The finger 296 has a surface 298 which, in the normal position of the finger 296, is aligned with the line of intersection between the edge portion 290 and the central portion 288, as is shown in FIG. 14. The finger 296 is normally retained in this position by means of a spring 299 which has one end thereof seated in the finger 296 and the opposite end thereof seated in a bracket 300 which is suitably secured to the edge portion 290. The finger 296 is movable outwardly towards the bracket 300 when engaged by a projecting portion of a work holder 52.

The finger 296 has an extension 301 which projects to the opposite side of the pin 297 from the main portion of the finger 296. An arm 302 is secured to the extension 301 by means of suitable fasteners 303. The arm 302 is generally Z-shaped in outline and has an adjustable screw 304 threaded in the end thereof opposite from the finger extension 301. The adjustable screw 304 is retained in an adjusted position by means of a lock nut 305. The adjustable screw is for the purpose of operating a switch 306 and is aligned with a plunger 307 of the switch.

The spring 299 reacts against the finger 296 and pivots it to a position wherein it retains the plunger 307 in its depressed position. However, when a portion of a work holder 52 engages the finger 296 and pivots the same, as shown in FIG. 16, the screw 304 will move away from the plunger 307 and permit the plunger to be projected outwardly from the switch 306 to change the position of the switch.

Referring now to FIG. 15, it will be seen that when a work holder 52 is positioned in alignment with the backup pad 287 and the draw ring 124 is in its fully retracted position, the die holder 117 will pass between the fingers 291 and 296 without engaging the surfaces 293 and 298, respectively, thereof. On the other hand, when the draw ring 124 does not fully retract after the panelling operation, it will be seen that the projecting draw ring 124, as is shown in FIG. 17, will engage the fingers 291 and 296 and effect the swinging apart thereof. When the finger 296 swings from its normal position of FIG. 14 to a position such as that shown in Fig. 16, the switch 206 will be acted upon in a manner so as to discontinue the operation of the machine 30.

TRIMMING APPARATUS

Referring now to FIGS. 18 through 21 of the drawings, it will be seen that the trimmer 72 includes a housing 308 which is rigidly mounted on the carriage 73 for movement therewith. The housing 308 has rotatably journaled therein the shaft 90 which is hollow. The shaft 90 is mounted within the housing 308 by means of spaced bearings 309, 310. It is to be noted that the housing 308 has removable end caps 311 which are held in place by fasteners 312. The housing 308 also carries a tubular spacer 313 which is disposed between the bearings 309 and 310. The end caps 311 clamp the bearings 309 and 310 against the opposite ends of the spacer 313 to prevent relative movement of the bearings with respect to the housing 308.

The left end of the shaft or spindle 90 is of a larger external diameter than the remaining portion thereof to define an annular shoulder 314 against which the inner race of the bearing 309 is engaged. The inner races of the bearings 309 and 310 are spaced by means of an inner spacer 315. Another spacing ring 316 engages the right end of the bearing 310. The pulley 89 is keyed onto the shaft or spindle 90 by means of a key 317 and abuts the spacing ring 316. A locking nut 318 is threaded onto the spindle 90 and retains the pulley 89 in place.

It is to be noted that the left end of the spindle 90 is provided with a plurality of cutters 319. The cutters 319 are circumferentially spaced and are so mounted on the spindle 90 so as to be removable. The positions and shapes of the cutters 319 are such that when they are engaged with the open end of the tubular member 103, they will constantly cut away the metal of the tubular member so as to reduce the length thereof.

Referring now to FIG. 18 in particular, it will be seen that the carriage 73 is constantly urged to the right by means of a spring 321 which is mounted on a rod 322 which has one end thereof secured to the right end of the carriage 73 and which is slidably mounted in a slide block 323 fixedly carried by the frame 320 of the machine. Because the compression spring 321 exerts a force on the carriage 73 at all times, the cam follower 83 will always ride on the innerface of the cam track 84. In this manner the desired guided relationship between the cam track 84 and the cam follower 83 is facilitated.

The movement of the carriage 73 to the left is limited by means of a bracket 324 which is carried by the frame 320 between the ways 74. The bracket 324 carries an adjustable stop screw 325 which is engageable with the left end of the carriage 73 which, if desired, may be in the form of a stop pin.

At this time it is pointed out that the motor 86 is fixedly supported with respect to the frame 320 by means of a mounting bracket assembly 326. It is to be noted that in the retracted position of the trimmer 72, the pulley 89 is disposed to the right of the pulley 88. Thus, there is some twisting or flexing of the belt 91. On the other hand, when the trimmer 72 is in its operative position, as is shown by dotted lines in FIG. 18, the pulley 89 is shifted to the left and may move to the left of the pulley 88. In this position of the trimmer 72, there is also a slight twisting of the belt 91. However, in either position of the trimmer 72, there is no undue twisting of the belt 91.

It is to be apparent that when the trimmer 72 is moved towards the open end of a tubular member 103, and the cutters 319 engage the end of the tubular member, the length of the tubular member will be progressively decreased. Inasmuch as the final length of the can body which is formed from the tubular member 103 depends upon the accurate positioning of the tubular member within the work holder 52, as well as the accurate movement of the trimmer 72, it will be readily apparent that it is desirable that the tubular member 103 be fully seated within the work holder when the trimming operation commences. Accordingly, vacuum is maintained in the work holder as it moves from the panelling to the trimming station. It is also desired that the tubular member be tightly gripped in the holder during trimming and to effect the tight gripping, the cam surface of the cam 176 falls away from the cam follower 174 so as to lose contact therewith at the trimming station. The holder 52 will thus hold the tubular member with the maximum tightness as set by the adjustment of the spring 191.

In order that the waste material cut from the tubular members 103 may be automatically discharged, it is the intent of this invention that the waste material be drawn through the hollow spindle 90. To this end, there is suitably telescoped over the hollow spindle 90 a pipe 327 which has a lubricated felt sealing ring 399 which is attached as shown to the end thereof which allows for rotation and reciprocation of the hollow spindle 90 therein but prevents the leakage of air thereby. The opposite end of the pipe 327, as is shown in FIG. 19, has piping 328 connected thereto. The piping 328 is suitably supported by the frame 320 and is connected to the intake of a centrifugal air pump 329. The air pump 329 is driven by an electric motor 330 and has a discharge tube 331. It will be readily apparent that the waste material may be discharged through the discharge tube into any suitable type of collector.

At this time it is pointed out that the spindle 90 could be formed so that the enlarged end thereof is sectional and therefore, the length thereof varied so that the machine 30 could be utilized in forming cans of different heights or lengths.

FLANGING APPARATUS

Referring to FIG. 22, it is to be understood that the tubular member, after it has been cut to length by the trimmer 72, may now be considered a can and is referred to by the numeral 332. In order that the can 332 may have a closure secured to the open end thereof, it is desirable that the can be flanged to effect the closing thereof by means of a conventional double seaming apparatus. In order to effect the flanging of the can 332, there is provided a flanging apparatus, which is generally referred to by the numeral 333.

In FIG. 3 it is clearly shown that the flanging apparatus is disposed at the 8 o'clock position of the tool holder 62. The flanging apparatus 333 includes a plunger 334 which has an extension 335 seated in an opening 336 in the tool holder 62. The plunger 334 also includes a mounting flange 337 which is secured in place by a plurality of bolts 338. A fitting spacer 339 is disposed between the mounting flange 337 and the opposing face of the tool holder 62 to properly position the plunger thereon.

The left end of the plunger 334 has secured thereto an interchangeable spacer 340. A flanging die 341 is clamped to spacer 340. A clamp bolt 342 passes through the die and the spacer and secures the two to the plunger 334. It is to be noted that the die is provided with a flanging ring 343.

When the turret 51 is indexed so that the can-bearing work holder 52 is aligned with the flanging apparatus 333, and tool holder 62 is moved towards the turret 51, it will be seen that the die 341 will engage the exposed end of the can 332 and effect the flanging thereof to define a flange 344. It is desirable that the work holder have the die holder 117 thereof backed up by means of a suitable backup pad, such as the backup pad 345, FIGS. 1 and 2, carried by the backup plate 49 in front of the Ferguson drive unit.

During the flanging operation the can will be only moderately gripped in the holder 52. This is accomplished by the rising of the cam surface of the cam 176 from its maximum low position at the trimming station to the proper level whereat it will position the cam follower 174 to effect the proper moderate gripping action of the can in the work holder 52.

After the flanging operation, the forming of a can from the closed end tubular member 103 is completed and the operation of the machine 30 may be terminated by indexing the flanged can to the 10 o'clock position of the machine, as is shown in FIG. 3. When the flanged can is in the 10 o'clock position of FIG. 3 and is retracted from its associated work holder 52, it is again engageable with the feed turret 54 for movement towards the discharge chute 56. In order to accomplish the withdrawal of the can from the work holder, it is necessary that there be provided a suitable retractor which is generally referred to by the numeral 346, FIGS. 24, 25, 26 and 27.

RETRACTOR APPARATUS

Referring now to FIG. 24 in particular, it will be seen that the backup plate 49 of the Ferguson drive unit has mounted thereon a backup pad assembly which is generally referred to by the numeral 347. The backup pad assembly 347 includes a plate 348 which is suitably secured to the backup plate 49. A second plate 349 is carried by the plate 348 and is spaced from the backup plate 49. The plate 349, in turn, carries a cam 350 which is oriented for being received in the groove 123 of the die holder 117 of the associated work holder 52. Thus, when a work holder 52 approaches the discharge station shown in FIG. 3, the die pad is forced to the right in FIG. 24 so as to move the flanged can 332 out of the work holder. It is pointed out that when the work holder is in the discharge position thereof, the associated cam follower 173 is in engagement with a projecting portion of the cam 176 so that the spring assembly 177 will be compressed and the collet clamping ring 163 will be moved to a collet releasing position. Thus, the can 332 is free to be easily withdrawn from the work holder.

Referring to FIG. 24 in particular, it will be seen that the portion of the frame structure adjacent the turret 51 is provided with a can passing opening 351 in alignment with the discharge station. A similar opening 352 is formed in the plate 99. This permits the freedom of movement of a can into the interior of the frame structure 93 and into an aligned pocket 97 of the feed turret 54. Inasmuch as the pocket 97 is disposed lowermost at the time it receives a can 332, there are provided two spaced apart can support rails 353 below the path of movement of the feed turret 54. The support rails 353 are clearly shown in FIG. 3 and are so shaped so as to guide discharged cans into the discharge chute 56.

The retractor 346 includes a plunger 354 which is carried by a sleeve 355 which is part of the tool holder 62. The plunger 354 has a reduced end portion 356 disposed remote from the sleeve 355. The reduced end portion 356 is provided with three sets of ears 357 which are equally spaced about the circumference of the reduced end portion 356. Each set of ears 357 has a pivot pin 358 extending therebetween. A can gripping shoe 359 is pivotally mounted on each of the pivot pins 358 and extends longitudinally of the plunger 354. Each shoe 359 has an outer rounded nose 360 to facilitate the entrance thereof into a can 332.

It is to be noted that each shoe 359 has the nose 360 thereof resiliently urged outwardly by means of a spring 361 which has the opposite ends thereof seated in the plunger 354 and the shoe 359. The outward movement of the shoe nose 360 is limited by means of a stop screw 362 which is threaded in the portion of the shoe 359 remote from the nose 360 and which is engageable with the reduced end portion 356 of the plunger to limit the outward swinging of the nose 360. The stop screw 362 is provided with a lock nut 363 to retain it in an adjusted position. It is to be understood that the shoes 359 have the stop screws 362 thereof so adjusted whereby when the stop screws engage the plunger 354, the shoes 359 will be in light frictional engagement with the associated can 332. If desired, the shoes 359 may be provided with friction pads along the can engaging surfaces thereof.

The reduced end portion 356 of the plunger is also provided with three brackets 364 which are spaced equally about the circumference of the end portion 356 and spaced equally between the shoes 359. Each bracket is secured to the plunger 354 by a pair of bolts 365 and has a pair of spaced ears 366 projecting radially outwardly therefrom. Each of the ears 366 carries a transverse pivot pin 367 on which an intermediate portion of a finger 368 is pivotally mounted. It is to be noted that the left end of each of the fingers 368 is provided with an inwardly directed hook 369 particularly shaped for gripping the flange 344 of a can 332.

In order that the hook 369 may be resiliently retained in a flange engaging position, each bracket 364 carries a spring 370 which engages a portion of the finger 368 on the side of the pivot pin 367 remote from the hook 369. As a result, the spring 370 pivots the finger 368 in a counterclockwise direction, as viewed in FIG. 26. The pivoting of the finger 368 due to the urging of the spring 370 is limited by means of a stop screw 371 which is adjustably threaded into the plunger 354.

At this time it is also pointed out that the hook 369 of the finger 368 has a rounded nose 372 to facilitate the automatic riding of the hook 369 radially outwardly of a flange 344. When the plunger 354 moves from its retracted position shown in FIG. 24 to engage the projecting end of a can 332, as is shown in FIG. 26, the rounded nose 360 of each shoe 359 will come into engagement with the curled flange 344 of the can and the fingers 368 will be slightly cammed inwardly against the outward urging of the springs 361.

At the same time, the rounded nose 372 of each finger 368 will engage the flange 344 and be cammed radially outwardly so that the hook 369 may pass thereover. When the plunger 354 is in its fully projected position, as shown in FIG. 26, the hook 369 of each finger 368 is locked behind the flange 344 and the shoes 359 are in frictional gripping engagement with the internal surface of the can 332. Thus, the can is so gripped by the retractor 346 so that it may be withdrawn from the work holder 52 when the plunger 354 is retracted.

It will be readily apparent from FIG. 26 that the retractor 346 is positively interlocked with the can in a manner wherein the can carried by the plunger 354 may be fully supported thereby in cantilever relation. Therefore, the can may be fully withdrawn from the work holder 52 prior to the releasing thereof from the retractor 346. In order to effect the releasing of the can from the retractor 346, there is provided a sleeve which is generally referred to by the numeral 373. The sleeve 373 is supported by a frame member 374 which is part of the frame structure 93. It is to be noted that the sleeve 373 has a bell or enlarged end portion 375 at the left end thereof and that the right portion thereof is generally cylindrical.

Each finger 368 has at the right end thereof a cam follower 380 which is carried by a transverse pivot pin 381. When the plunger 354 is retracted and the fingers 368 pass into the sleeve 373, it will be seen that the cam followers 380 will engage the cam surface 379 and be moved radially inwardly. As a result, the hooks 369 thereof will be moved radially outwardly and disengaged from the can 332, as is clearly shown in FIG. 27.

When the fingers 368 are disengaged from the can 332, the can is still not released in that the shoes 359 still frictionally grip the inner surface thereof. As the plunger 354 continues to move to the right from its position shown in FIG. 27, the can 332 moves therewith until the flange 344 thereof engages the left face of a stripper plate 382 on the sleeve 373. Further movement of the plunger 354 to the right will result in the sliding of the shoes 359 out of the can 332 and the final releasing of the can. As is clearly shown in FIG. 24, the shoes and the fingers are fully retracted within the sleeve 373 in the retracted position of the plunger 354.

When the can 332 is released from the retractor 346, it is fully positioned within one of the pockets 97 of the feed turret and supported by the can support rails 353. When the feed turret 54 is next indexed, the can will be moved along the rails 353 until it rolls off into the discharge chute 56.

After a can 332 has been removed from a work holder 52, and the machine is next indexed, it will be seen that the newly emptied work holder 52 is presented to the feed turret 54 at the infeed position thereof. Thus, the machine 30 has no wasted stations and a maximum efficiency is obtained therewith.

Referring now to FIG. 24 in particular, it will be seen that the support structure 93 has a suitable mounting bracket 383 secured to the left face thereof. The mounting bracket 383 supports a switch 384 having a control arm 385 depending therefrom. It is to be noted that the control arm 385 is generally aligned with the space between the right ends of the can holders 52 and the left surface of the support structure 93.

The purpose of the switch 384 is to stop the operation of the machine 30 in the event a can 332 is not fully removed from one of the work holders 52. It will be readily apparent that in some instances the retractor 346 will not properly function and a can will not be withdrawn from the associated work holder. The switch 384 is so positioned that as soon as the turret 350 begins to index, in the event a can is not removed from the work holder 52, it will trip the switch 384.

Referring once again to FIG. 1 in particular, it will be seen that there is shown a control timer 386 having an input shaft 387 which is provided with a sprocket 388. A brake timer 389 is mounted adjacent the timer 386 and has an input shaft 390. A sprocket 391 is carried by the input shaft 390. The sprockets 388 and 391 are aligned with the control unit drive sprocket 69 carried by the crankshaft 66 and are driven therefrom by means of a chain 392.

The timer 386 is a purchased conventional timer of the electric control type which may be coupled in an electrical control system with other switches in a manner wherein it controls the opening of a circuit to an electric motor by control switches until an associated shaft reaches a predetermined position. The timer 386 is so timed with respect to the movement of the crankshaft 66 so as to always discontinue power to the electric motor 31 when the crankshaft 66 is in its fully retracted position. This has a definite advantage in a machine, such as the machine 30, in that should any jam occur in the machine, the tools carried by the tool carrier 62 are fully retracted so that the jammed article may be readily removed from the machine. If a tool is permitted to stop in a jammed position, it frequently becomes wedged in that position and it is extremely difficult to remove the tool. However, if the inertia of the tool and the drive means therefor is relied upon, the jam can be overcome.

The brake control time 389 is coupled to a suitable purchased brake 393 which is schematically illustrated in FIG. 1 and is illustrated as being mounted on the shaft 36. It is to be understood that the brake 393 will be actuated by the brake control timer 389 at the same time the power supply to the electric motor 31 is cut off so as to assure the stopping of the crankshaft 66 in the fully retracted position of the tool holder 62. It will be readily apparent that if the brake 393 is not provided, under varying conditions, the inertia forces will cause the crankshaft 66 to rotate to various positions.

Although only a preferred embodiment of the machine has been specifically illustrated and described herein, it is to be understood that minor variations may be made therein without departing from the spirit and scope of the invention, as defined by the appended claims.

We claim:

1. An apparatus for automatically forming cans from closed end tubular members, said apparatus comprising a turret having an axis, a plurality of equally spaced work holders mounted on said turret concentrically of said turret axis and having axes parallel to said turret axis, a multiple tool holder, means mounting said tool holder for reciprocatory movement generally along said turret axis, tools carried by said tool holder in alignment with said work holders, drive means connected to said turret and said tool holder for indexing said turret and reciprocating said tool holder in timed relation, a separately mounted tool axially aligned with an indexed position of one of said work holders, and means driven by said drive means independently reciprocating said separately mounted tool in timed relation to the indexing of said turret and a different distance from the distance of movement of said tool holder.

2. An apparatus for automatically forming cans from closed end tubular members, said apparatus comprising a turret having an axis, a plurality of equally spaced work holders mounted concentrically of said turret axis and having axes parallel to said turret axis, a multiple tool holder, means mounting said tool holder for reciprocatory movement generally along said turret axis, tools carried by said tool holder in alignment with said work holders, and drive means connected to said turret and said tool holder for indexing said turret and reciprocating said tool holder in timed relation, said tools including a pusher for positioning tubular members in said work holders, a flanger for flanging can bodies formed from the tubular members and a flange engageable extractor.

3. An apparatus for automatically forming cans from closed end tubular members, said apparatus comprising a turret having an axis, a plurality of equally spaced work holders mounted concentrically of said turret axis and having axes parallel to said turret axis, a multiple tool holder, means mounting said tool holder for reciprocatory movement generally along said turret axis, tools carried by said tool holder in alignment with said work holders, and drive means connected to said turret and said tool holder for indexing said turret and reciprocating said tool holder in timed relation, each work holder having end panelling means and said tools including a panelling tool receivable in a tubular member and cooperative with said work holder end panelling means.

4. An apparatus for automatically forming cans from closed end tubular members, said apparatus comprising a turret having an axis, a plurality of equally spaced work holders mounted concentrically of said turret axis and having axes parallel to said turret axis, a multiple tool holder, means mounting said tool holder for reciprocatory movement generally along said turret axis, tools carried by said tool holder in alignment with said work holders, and drive means connected to said turret and said tool holder for indexing said turret and reciprocating said tool holder in timed relation, said drive means including a rotating crank connected to said tool holder for converting continuous rotary motion to reciprocal movement and an indexing mechanism connected to said turret for converting like continuous rotary motion to regular periodic rotary motion.

5. A work holder for tubular members comprising a base, a collet projecting from said base, a housing projecting from said base in surrounding relation to said collet, and collet clamping means carried by said housing for rotation between a collet clamping position and a collet releasing position.

6. The work holder of claim 5 wherein said base has a die pad for cooperation with a punch to perform a panelling operation on a tubular member having a closed end.

7. The work holder of claim 5 wherein said base has a die pad and a draw ring for cooperation with a punch to perform a panelling operation on a tubular member having a closed end, said draw ring having a annular seat surrounding said die pad, and means resiliently mounting said draw ring for resisted movement into said base.

8. The work holder of claim 5 wherein said base has a die pad for cooperation with a punch to perform a panelling operation on a tubular member having a closed end, and means resiliently mounting said die pad for resisted movement into said housing to effect the discharge of members from said work holder.

9. A work holder particularly adapted for receiving a tubular member having a closed end with a panelling operation to be performed on a tubular member closed end when the same is in said work holder, said work holder comprising a housing having an open end and a die holder at the other end, a draw ring resiliently seated in said die holder, and a die pad disposed generally within said draw ring.

10. The work holder of claim 9 wherein said die pad has a stem projecting through said die holder for engagement with a backup pad.

11. The work holder of claim 9 wherein said die pad has a stem projecting through said die holder for engagement with a backup pad, and means resiliently mounting said die pad for resisted movement into said housing through said draw ring.

12. The work holder of claim 9 together with means for drawing a vacuum within said work holder to assure the seating of a tubular member on said draw ring.

13. A turret comprising a turret plate having a plurality of work holders arranged in circumferentially spaced relation thereon, each of said work holders including a housing having a collet mounted therein, and a collet clamping assembly rotatably journaled on said housing, a centrally positioned cam, a cam follower carried by each clamping assembly and engaging said cam, and resilient means constantly urging rotation of said clamping assembly to hold each cam follower engaged with said cam whereby opening and closing of each collet is controlled by relative movement between each work holder and said cam.

14. The work holder of claim 13 wherein resilient means extends between each work holder and one adjacent work holder.

15. A position detecting tool for use in conjunction with a tubular member having one closed end, said tool comprising a plunger having a smoothly flaring nose portion to facilitate the entry thereof into a tubular member, a detector slidably carried by said plunger and having an end engageable head disposed in advance of said plunger and control means connected to said plunger for movement therewith and to said detector for actuation by said detector upon relative movement of said detector with respect to said plunger.

16. An apparatus for panelling ends of tubular members comprising a work holder and a panelling tool, said work holder including a housing having an open end and a die holder at the other end, a draw ring resiliently seated in said die holder, and a die pad disposed generally within said draw ring, said panelling tool including a plunger mounted for reciprocatory movement into and out of said housing and a punch carried by said plunger for cooperation with said draw ring and said die pad.

17. The apparatus of claim 16 wherein said work holder has means for drawing a vacuum therein to seat a tubular member end on said draw ring and said panelling tool has means for applying air under pressure through said punch to facilitate the stripping of a tubular member from said panelling tool.

18. The apparatus of claim 16 wherein said die pad has a stem projecting through said die holder, and a fixed backup pad engageable with said die pad stem to limit movement of said die pad during a panelling operation.

19. An apparatus for trimming an end of a tubular member comprising a work holder having means for longitudinally positioning a tubular member, a rotary cutter particularly constructed for engaging a tubular member in endwise relation, first means for longitudinally reciprocating said cutter, and second means for rotating said cutter, said cutter having a hollow spindle, and means attached to said spindle for drawing cuttings through said spindle.

20. A retractor for removing a flanged tubular body from a work holder comprising a plunger having a plurality of resiliently mounted shoes projecting from one end thereof for internal frictional engagement with a tubular body, and a plurality of fingers carried by said plunger in alternating relation with said shoes, said fingers having terminal hooks for engaging behind a flange and being resiliently mounted on said plunger.

21. The retractor of claim 20 wherein cam means are provided for automatically moving said fingers to flange releasing positions upon the movement of said plunger past a predetermined position, and stop means for engaging and stopping the movement of a body at a further predetermined position to strip a body from said shoes upon further movement of said plunger.

22. The retractor of claim 20 wherein said shoes and said fingers have rounded noses for automatically moving said shoes and fingers into body gripping positions upon the engagement thereof with a flanged tubular body.

23. A feed mechanism for transferring tubular members each having a closed end with respect to a work turret having a plurality of work holders, said feed mechanism comprising a feed turret, means for indexing said work turret and said feed turret in unison, said feed turret having pockets spaced in accordance with the spacing of said work holders, and said feed turret being in overlapping relation to said work turret with said feed turret having adjacent feed and discharge positions and overlapped portions of said turrets moving in opposite directions.

24. The feed mechanism of claim 23 wherein said turrets have horizontal axes and are longitudinally offset, and fixed guide means intermediate said turrets at said feed position for supporting and guiding a tubular member being transferred.

25. The feed mechanism of claim 23 wherein said turrets have horizontal axes and are longitudinally offset, and fixed guide means intermediate said turrets at said feed position for supporting and guiding a tubular member being transferred, said guide member being disposed closely adjacent said work turret and having a portion thereof in the path of a tubular member carried by said work turret, said guide member portion being pivotally and resiliently mounted.

26. The feed mechanism of claim 23 wherein said turrets have horizontal axes and are longitudinally offset, and fixed guide means intermediate said turrets at said feed position for supporting and guiding a tubular member being transferred, and a longitudinally removable retractor at said discharge position, said retractor having means for supporting a tubular member during the transfer thereof from said work turret to said feed turret.

27. The feed mechanism of claim 26 together with a tubular member detector for detecting the presence of a tubular member not transferred by said retractor.

28. An apparatus for automatically forming cans from closed end tubular members, said apparatus comprising a turret having an axis, a plurality of equally spaced work holders mounted on said turret concentrically of said turret axis and having axes parallel to said turret axis, a multiple tool holder, means mounting said tool holder for reciprocatory movement generally along said turret axis, tools carried by said tool holder in alignment with said work holders, drive means connected to said turret and said tool holder for indexing said turret and reciprocating said tool holder in timed relation, each of said work holders having a resiliently mounted base portion, and backup pads aligned with said work holders at certain of the positions thereof for engagement by said base portions to accurately position and support said base portions during the performing of operations by certain of said tools.

29. An apparatus for automatically forming cans from closed end tubular members, said apparatus comprising a turret having an axis, a plurality of equally spaced work holders mounted on said turret concentrically of said turret axis and having axes parallel to said turret axis, a multiple tool holder, means mounting said tool holder for reciprocatory movement generally along said turret axis, tools carried by said tool holder in alignment with said work holders, drive means connected to said turret and said tool holder for indexing said turret and reciprocating said tool holder in timed relation, said tools in sequence including a pusher for positioning tubular members in said work holders, a tubular member position detecting tool, a panelling punch, an open space, a flanging tool, and a retractor.

30. An apparatus for automatically forming cans from closed end tubular members, said apparatus comprising a turret having an axis, a plurality of equally spaced work holders mounted on said turret concentrically of said turret axis and having axes parallel to said turret axis, a multiple tool holder, means mounting said tool holder for reciprocatory movement generally along said turret axis, tools carried by said tool holder in alignment with said work holders, drive means connected to said turret and said tool holder for indexing said turret and reciprocating said tool holder in timed relation, said tools in sequence including a pusher for positioning tubular members in said work holders, a tubular member position detecting tool, a panelling punch, an open space, a flanging tool, and a retractor, and a separately mounted trimmer aligned with said open space and being separately reciprocable in timed relation to the indexing of said turret.

31. The apparatus of claim 30 wherein a feed turret is provided for delivering tubular members to said work turret and for receiving formed cans therefrom.